United States Patent [19]

Wilwerding

[11] 4,247,762

[45] Jan. 27, 1981

[54] CONTRAST SENSING APPARATUS FOR AUTOMATIC FOCUS SYSTEMS

[75] Inventor: Dennis J. Wilwerding, Littleton, Colo.

[73] Assignee: Honeywell Inc., Minneapolis, Minn.

[21] Appl. No.: 965,361

[22] Filed: Nov. 30, 1978

[51] Int. Cl.³ .............................................. G01J 1/36
[52] U.S. Cl. ........................................ 250/204; 354/25
[58] Field of Search ................. 250/204, 201; 354/25; 356/4

[56] References Cited

U.S. PATENT DOCUMENTS

| | | |
|---|---|---|
| 3,274,914 | 9/1966 | Biederman et al. |
| 3,836,772 | 9/1974 | Stauffer . |
| 3,838,275 | 9/1974 | Stauffer . |
| 3,958,117 | 5/1976 | Stauffer . |
| 4,002,899 | 1/1977 | Stauffer . |
| 4,078,172 | 3/1978 | Wilwerding . |
| 4,085,320 | 4/1978 | Wilwerding . |
| 4,103,152 | 7/1978 | Stauffer . |
| 4,107,520 | 8/1978 | Wilwerding . |

Primary Examiner—David C. Nelms
Assistant Examiner—Darwin R. Hostetter
Attorney, Agent, or Firm—Charles J. Ungemach

[57] ABSTRACT

An improved automatic focus system wherein circuitry is provided to inhibit the focusing function when the scene being viewed provides too little contrast for satisfactory operation.

23 Claims, 15 Drawing Figures

CONTRAST SENSING APPARATUS FOR AUTOMATIC FOCUS SYSTEMS

BACKGROUND OF THE INVENTION

The present invention relates generally to apparatus for providing a measure of the distance between the apparatus and an object. In particular, the present invention is directed to automatic focusing systems in which a primary optical means such as the taking lens of a camera, is moved to maintain an image of the object in focus at the plane of a photographic film.

One highly advantageous type of automatic focus apparatus is the spatial image correlation type. Examples of different forms of arrangements of this type can be found in U.S. Pat. Nos. 3,836,772; 3,838,275; 3,958,117; 4,002,899; and 4,103,152 by Norman L. Stauffer and assigned to the same assignee as the present invention and in U.S. Pat. No. 3,274,914 by K. Bedermann et al.

In my U.S. Pat. No. 4,078,172 issued Mar. 7, 1978 and assigned to the assignee of the present invention, I provide a continuous automatic focus system that produces an operation that occurs only with respect to the position of the major extremum to supply an accurate focus correction signal and to drive the lens in an appropriate direction to achieve proper focus. In my U.S. Pat. No. 4,107,520, issued Aug. 8, 1978, I provide an improved continuous automatic focus system which permits proportional control, that is, driving of the motor to position the lens at relatively high rates for large errors and reducing the speed of the motor drive at smaller errors to prevent overshoot and focus oscillation. In my copending application Ser. No. 834,760 filed Sept. 19, 1977, which is assigned to the assignee of the present invention, I provide several improvements to continuous focus proportional controllers which give superior operation in various ways.

One problem which has been encountered relates to an operation of an auto focus system when the scene being viewed contains too little contrast for the light sensors in the electronics of the system to operate satisfactorily. This often produces a system which oscillates or hunts for a satisfactory focus condition or one which drives to a position where the subject is not in focus. Since the auto focus systems of the prior art operate by photometric comparison of the light falling on two detector arrays, the contrast between the background and the subject may so low that it is difficult to detect the subject with sufficient accuracy. This is particularly true in scenes where there is little horizontal contrast even though there may be good vertical contrast as, for example, in some scenes involving the horizon. The importance of horizontal contrast occurs because the system normally operates by comparing signals which are obtained by rotation of a mirror about a vertical axis so that the scan lines are horizontal. The low contrast problem may also arise during the panning of a movie camera particularly where the primary subject is not in the view of the auto focus system. While in a well aligned prior art system the lower limit of resolvable contrast may be quite low, there is in all cases a necessary lower limit imposed by variations in the match of the optical detectors. In view of this contrast limit, the focus system may make an error in determining the correct focus position under the above-described low contrast conditions.

In my U.S. Pat. No. 4,085,320, one solution to this problem is shown. In that patent, signals produced by detectors receiving radiation from the subject and from the background are compared throughout the range or area of the scene to determine whether there is sufficient difference and when the auto focus mechanism is activated. While the circuit of U.S. Pat. No. 4,085,320 operates satisfactorily for most situations, a difficulty may be encountered when fluctuation in the lighting occurs. For example, with flourescent lighting the variations in the correlation signal may cause the activation of the auto focus circuits even with insufficient contrast.

SUMMARY OF THE INVENTION

The system of the present invention provides a circuit which will automatically inhibit the operation of the auto focus system whenever it is determined that the contrast in the field of view is too low to provide satisfactory operation and will operate satisfactorily even when fluctuating light conditions occur. As used herein, the expression "inhibiting the operation at low contrast" is considered synonomous with allowing operation with satisfactorily high contrast. The inhibiting is accomplished by observing the magnitude of the variations in the correlation signal and producing an inhibit signal when they are less than a predetermined value at a predetermined portion of the signal. By using the predetermined portion of the signal as a contrast check point, the light fluctuation problem which might adversely affect the operation of prior art circuit is avoided. In a continuous focus proportional control system with which the invention will herein be described, the low contrast inhibit operation is obtained by comparing the voltage which may exist on the detector capacitor of this system with the correlation voltage so that when the correlation voltage is greater than the detector capacitor voltage by a predetermined amount at the predetermined portion of the signal, the circuit is inhibited so that the lens will not be positioned until the contrast has improved.

DESCRIPTION OF THE PRIOR ART

In order to better understand the present invention, it is believed necessary that a full description of one of the prior art circuits with which the present invention may be employed should be given. Accordingly, the following will be a complete description of the continuous focus proportional controller disclosed and claimed in the above-referred to copending application Ser. No. 834,760.

Figure 1:
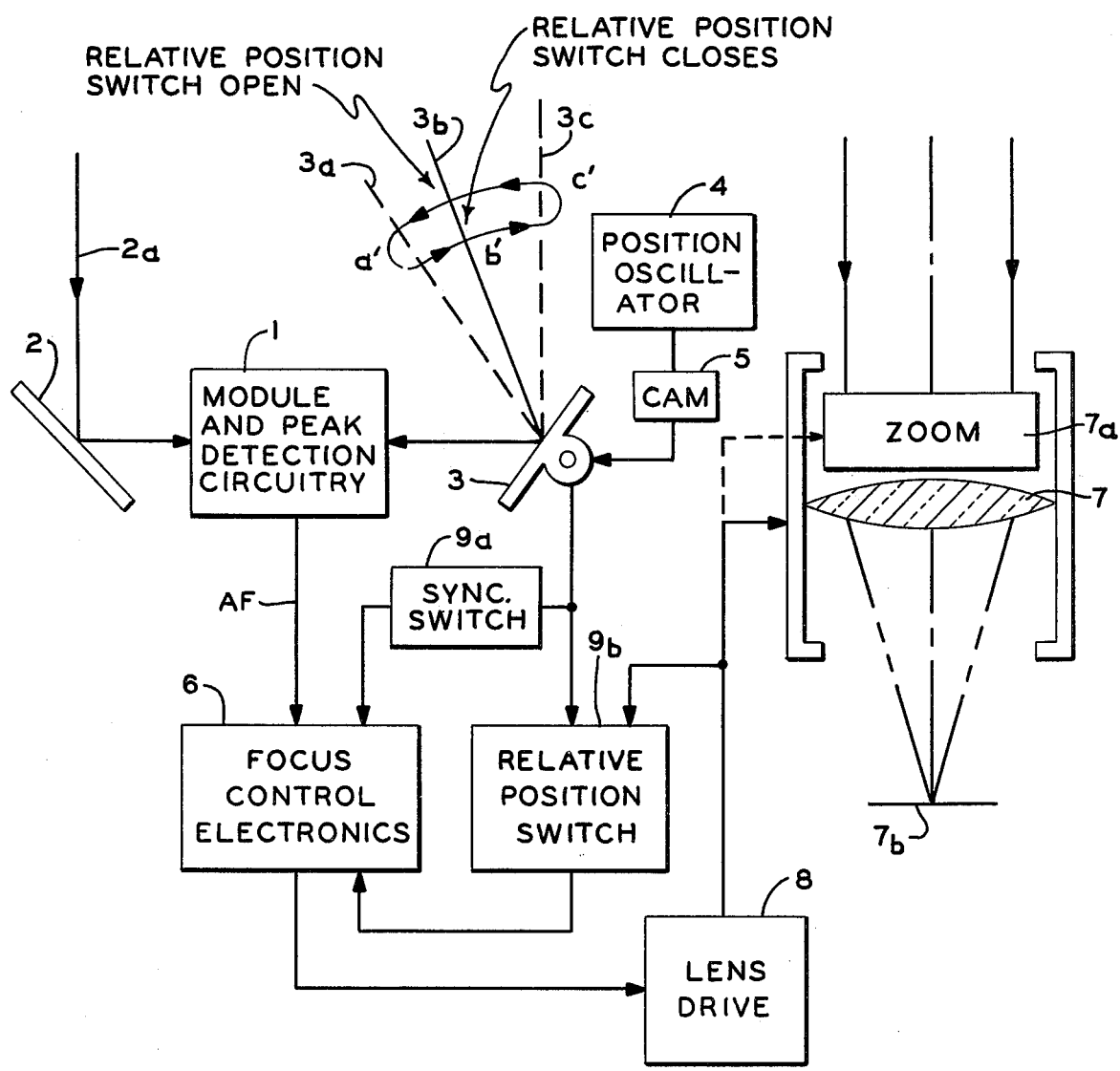
FIG. 1 shows a block diagram of a continuous focus proportional control system of the prior art taken from the above-referred to copending application Ser. No. 834,760.

In FIG. 1 the system includes a module and peak detection circuitry block, identified by reference numeral 1, which may be like that described in the above-mentioned copending application Ser. No. 804,111. Mirrors 2 and 3 are shown with mirror 3 being rotatable about an axis perpendicular to the plane of FIG. 1. Mirror 2 provides an optical path 2 for radiation to travel from the field of view being scanned to module 1 and mirror 3 provides an optical path to module 1 for radiation from the field of view at various positions therein depending upon the angular position of mirror 3. Three of these optical paths are shown as 3a, 3b and 3c, respectively, in FIG. 1.

A position oscillator, or drive mechanism 4, is shown operating through a cam or other motion characterizing means 5, to move mirror 3 back and forth across the field of view being scanned.

Module 1 receives the radiation from the mirrors 2 and 3 and determines where the best correlation of radiation on detectors in the module occurs so as to produce an auto focus signal, identified with the letters "AF" in FIG. 1, which will change from a low level or "0" magnitude to a high level or "1" magnitude whenever an extremum or peak in the correlation signal occurs. Since there may be several peaks encountered during a single scan, the auto focus signal may change from a "1" back to a "0" and back to a "1" several times during a single scan but the last of the transitions from "0" to "1" is indicative of the major peak and thus of the actual desired focus position. All of this is more completely described in the above-mentioned copending application Ser. No. 804,111 and in the above-mentioned Stauffer U.S. Pat. No. 4,002,899.

In FIG. 1, the auto focus signal is shown being presented from module 1 to focus control electronics 6, the operation of which will be explained in detail hereinafter. The output of the focus control electronics 6 is a signal whose pulse width varies with the amount of error between the present position of a lens 7, which may include zoom optics 7a, and the desired position of such lens in order to provide a properly focused image of an object in the field of view upon a plane 7b, which may be the plans of the film of a camera. This signal of varying pulse width from focus control electronics 6 is presented to a lens drive mechanism or motor 8, whose output is connected by gears or other drive means, to the lens 7 and zoom optics 7a for purposes of properly positioning them.

As mirror 3 moves through the field of view being scanned, a sync switch 9a will produce a signal at both the start and the finish of the active portion of the scan. Thus, in FIG. 1, if mirror 3 starts from a position a' which is a little nearer than the position where radiation from a very near object moves along path 3a to module 1, sync switch 9a will produce a signal which may be in the form of a transition from "0" to "1". When mirror 3 has moved to a position c' which is a little farther than the position where it is receiving radiation from a very far object or at infinity along a path such as 3c, sync switch 9a will produce a signal such as a transition from "1" back to a "0". Thus, the focus control electronics is aware of the beginning and the end of each active scan cycle. The mirror 3 may then be returned to its initial starting position and as is shown in FIG. 1, continually oscillates from position a', to position c' and back. Somewhere in its travel between position a' and c', mirror 3 will occupy a position b' in which it is receiving radiation from some portion of the field of view indicative of where the lens 7 and zoom optics 7a may be focusing. In this position, radiation from the field of view travels along path 3b to module 1. At this point in its travel, a relative position or "window" switch 9b, which is shown connected both to the lens drive mechanism 8 and to the mirror 3, produces a signal which is presented to the focus control electronics 6. As indicated in the upper part of FIG. 1, the relative position switch will be open between points a' and b' in the cycle but will close at position b' and remain closed during the cycle from position b' through position c' until it again arrives at position b', where it will again open. The signal to the focus control electronics may be a "1", whenever the relative position switch is open and may be a "0" whenever the relative position switch is closed. The sync switch 9a and relative position or "window" switch 9b may take a variety of different forms, depending upon the particular mechanical embodiment of the lens drive 8 and position oscillator 4 but should be able to operate for many cycles and should be capable of factory adjustments so as to permit system alignment. An example of a switch which may be used may be found in the above-mentioned Stauffer application Ser. No. 700,963.

Figure 2:
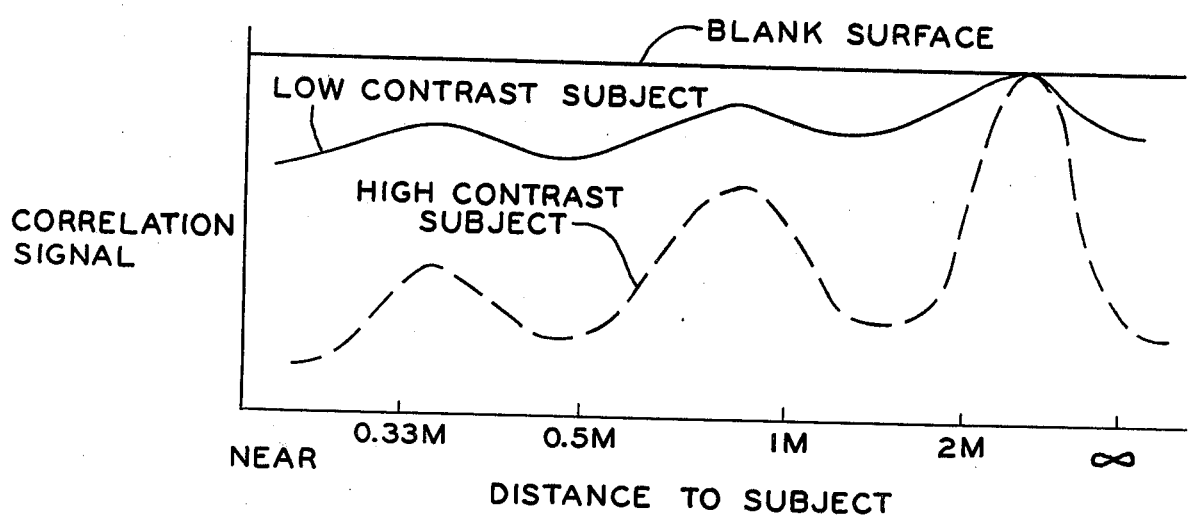
FIG. 2 shows the correlation signal as a function of distance to the subject for different contrast conditions.

FIG. 2 illustrates the correlation signal as a function of distance to subject. In FIG. 2 a subject somewhat further away than two meters from the optical system produces a major peak output corresponding to that distance and two other lesser peaks are shown. The curve labelled "high contrast subject" shows the major peak to be relatively sharp whereas in the curve labelled "low contrast subject" the major peak is shown to be rather smooth and not much higher than other peaks in the signal. The lowest of all possible contrasts; i.e., a blank surface, would produce a high correlation signal which had no variations at all. It is seen that the amount of variation from the peaks to the valleys is a measure of the amount of contrast in the scene being viewed. Also, it should be noted that the steepness of the slope between peaks and valleys is an indication of contrast.

Figure 3:
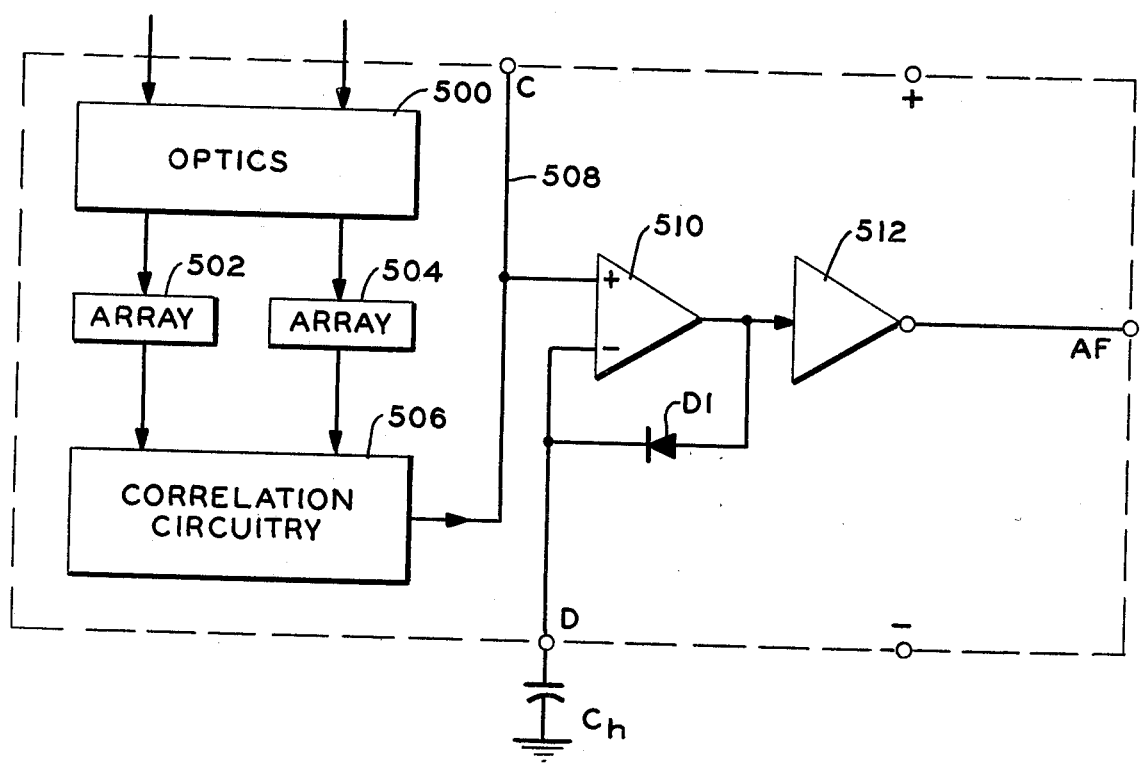
FIG. 3 shows the peak detection circuitry associated with the module of FIG. 1.

FIG. 3 shows the peak detection circuitry associated with the module. In FIG. 3, the module 1 includes optics 500 for forming two images of the scene being viewed, two detector arrays 502 and 504 to receive the images and produce output signals in accordance therewith and correlation circuitry 506 for producing a correlation signal proportional to the degree of correlation between the output signals from the detector arrays. The correlation signal increases positively with increasing correlation and is presented to a terminal labelled "C" by a conductor 508. The optics, detector arrays and correlation circuitry may be like that described in the above-mentioned U.S. Pat. No. 4,002,899.

Extremum sensing circuitry is provided in module 1 to process the correlation signal to determine when the major correlation extremum occurs. In the embodiment shown in FIG. 3, the major extremum is a peak and the extremum sensing circuitry is peak detection circuitry.

This circuitry includes differential amplifier 510, diode D1, inverter 512 and a detector capacitor $C_h$. In the embodiment shown in FIG. 3, detector capacitor $C_h$ is external and is connected to a terminal of module 1 labelled "D". Module 1 develops at a terminal labelled "AF" a digital positive going output or auto focus signal at correlation maxima capable of operating external circuitry to stop the camera lens at the proper focus position. It is this change of state of the output signal and not the output signal level which is indicative of the occurrence of the focus peak.

Figure 4A:
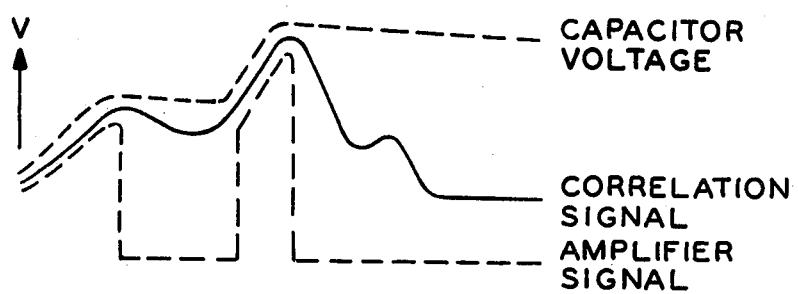
FIGS. 4a and 4b show an example of the detector capacitor voltage, the correlation signal, the amplifier signal and the Autofocus output signal produced by the module of FIG. 3.
Figure 4B:
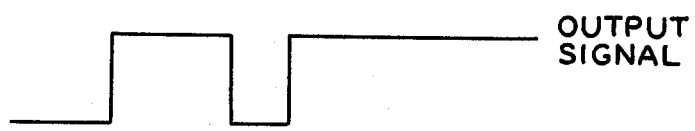

Detector capacitor $C_h$ connected to the "D" terminal provides a hold or comparison signal for the peak detection circuitry and to a large extent controls the sensitivity, and overall characteristics of the focus system. Differential amplifier 510 compares the correlation signal with the voltage stored on hold capacitor $c_h$. As the correlation signal rises in voltage, the output of amplifier 510 rises in voltage with it, charging capacitor $C_h$ through feedback diode D1 connected between the output and inverting input. This causes the inverting input to follow the non-inverting input so that the voltage on capacitor $C_h$ is equal to the correlation signal voltage during that portion of time when the correlation signal is rising. Once the correlation signal reaches its peak value and begins to decrease, the voltage on the hold capacitor $C_h$ cannot decrease because of the decoupling of feedback diode D1. Consequently, the output voltage of amplifier 510 falls immediately to negative supply potential. This rapid decrease in the amplifier signal is indicative of a correlation or major peak having occurred. The output of amplifier 510 is inverted by an inverter 512 so as to produce the auto focus signal at the "AF" terminal of module 1. The amplifier signal following a complex correlation waveform is shown in FIG. 4a. FIG. 4b shows the AF output signal from module 1 produced from the amplifier signal of FIG. 4a.

During the scan shown in FIGS. 4a and 4b, the amplifier signal follows the input correlation signal until the first minor peak is reached, at which time the signal drops to negative supply. The amplifier signal begins to rise again when the correlation signal achieves the value equal to the first minor peak and continues to rise until the major peak or correlation peak is found. At this point, the amplifier signal again drops to negative supply and remains in that state until the end of the scan. Because of inverter 512 of FIG. 3, the output signal of FIG. 4b changes from a "0" to a "1" at the minor peak, back to a "0" when the amplifier signal again increases above the capacitor voltage and back to a "1" when the amplifier signal drops back to the negative supply for the last time. The last transition of the AF output signal from "0" to "1", therefore, represents the occurrence of the major peak.

Figure 5:
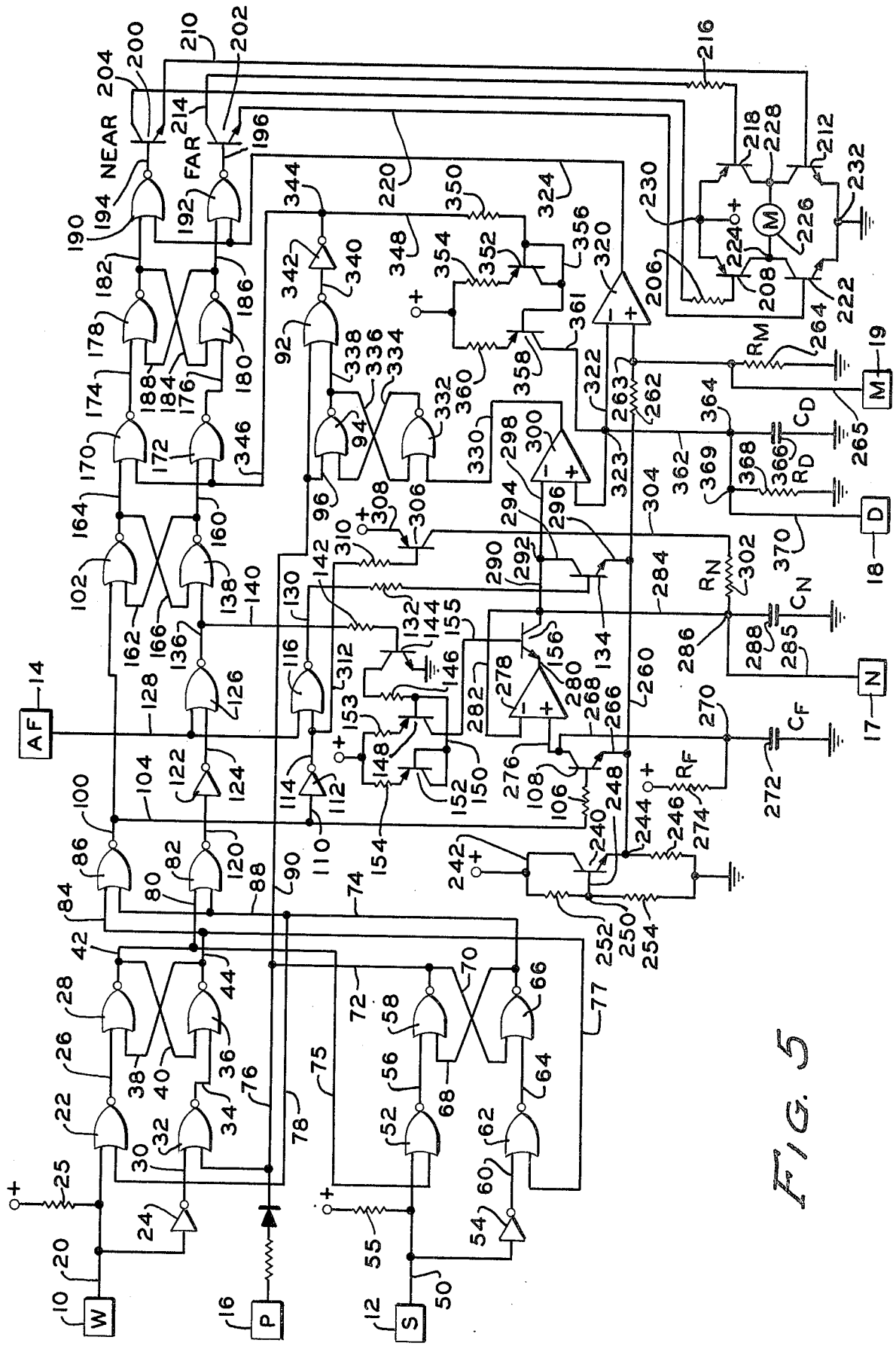
FIG. 5 is a schematic diagram of the continuous focus proportional control electronics of FIG. 1.

FIG. 5 shows a schematic diagram of the continuous automatic focus proportional control electronics of the above-referred to copending application Ser. No. 834,760. A terminal 10 is shown as a box containing the letter "W" representing the input from the "window" or relative position switch 9b of FIG. 1, a terminal 12 is shown as a box containing the letter "S" representing the input from the "sync" switch 9a of FIG. 1 and a terminal 14 is shown as a box with the letters "AF" representing the auto focus signal from the module 1 of FIG. 1.

Also shown in FIG. 5 is a terminal 16 which is shown as a box containing the letter "P". This terminal, as will be later described, may be connected to the detector output of the peak detection circuitry described in FIG. 3 and when so connected operates to remove the charge on the detector capacitor $C_h$ of FIG. 3 whenever the sync switch operates at the completion of a scan. This terminal is not used in one embodiment of the present invention as will be later discussed.

FIG. 5 also shows a terminal 17 as a box containing the letter "N", a terminal 18 as a box containing the letter "D" and a terminal 19 as a box containing the letter "M". The purpose of terminals 17, 18 and 19 will be later discussed in connection with the low contrast sensing and inhibiting apparatus of the present invention.

The system of FIG. 5 will utilize the signals appearing on terminals 10, 12 and 14, to drive a motor in a first or second direction so that the primary optical element or lens of a system, such as a camera, may be positioned for best focus.

As seen in FIG. 5, terminal 10 is connected by a conductor 20 to one input of a NOR gate 22, to the input of an inverter 24 and through a resistor 25 to the system's source of positive potential. The output of NOR gate 22 is connected by a conductor 26 to one input of a NOR gate 28. The output of inverter 24 is connected by a conductor 30 to one input of a NOR gate 32. The output of NOR gate 32 is connected by a conductor 34 to one input of a NOR gate 36. The output of NOR gate 36 is connected by a conductor 38 to the other input of NOR gate 28 and the output of NOR gate 28 is connected by a conductor 40 to the other input terminal of NOR gate 36. In this configuration, NOR gates 22, 28, 32 and 36, along with inverter 24 comprise a first flip-flop, the non-inverted output of which is the output of NOR gate 28 on conductor 42 and the inverted output of which is the output of NOR gate 36 on conductor 44.

The sync switch terminal 12 is shown connected by a conductor 50 to one input terminal of a NOR gate 52, to the input of an inverter 54 and through a resistor 55 to the system source of positive potential. The output of NOR gate 52 is connected by a conductor 56 to one input of a NOR gate 58. The output of inverter 54 is connected by a conductor 60 to one input of a NOR gate 62, the output of which is connected by a conductor 64 to one input of a NOR gate 66. The output of NOR gate 66 is connected by a conductor 68 to the other input of NOR gate 58 and the output of NOR gate 58 is connected by a conductor 70 to the other input of NOR gate 66. NOR gates 52, 58, 62 and 66, along with inverter 54, comprise a second flip-flop, the non-inverted output of which is the output of NOR gate 58 on conductor 72 and the inverted output of which is the output of NOR gate 66 on conductor 74.

The two flip-flops above-described are crossconnected so as to operate as a sort of third overall flip-flop. To this end, the non-inverted output of the first flip-flop circuit on conductor 42 is connected by a conductor 75 to the other input terminal of NOR gate 52 in the second flip-flop circuit. Likewise, the non-inverted output of the second flip-flop circuit appearing on conductor 72 is connected by a conductor 76 to the other input terminal of NOR gate 32 in the first flip-flop circuit. In similar fashion, the inverted output of the first flip-flop circuit on conductor 44 is connected by a conductor 77 to the second input terminal of the NOR gate 62 in the second flip-flop circuit, while the inverted output of the second flip-flop circuit on conductor 74 is connected by a conductor 78 to the other input terminal of NOR gate 22 in the first flip-flop circuit.

It is these two cross-coupled flip-flops which operate to provide electronic "debouncing" of the window and sync switches. In other words, when mechanical switches close or open, they may tend to bounce on their contacts producing a series of separate signals which is undesirable particularly in a system such as the present one which requires very close timing. The cross-coupled flip-flops will accept the first closure or opening of the bouncing switches and will ignore any further bouncing contacts that may result so long as the switches operate alternately and the bouncing of the contacts do not overlap. This allows for accurate mechanical positioning of the switch closing point and provides improved focus accuracy. A more detailed description of the operation of the cross-coupled flip-flops will be set forth hereinafter.

The non-inverted output of the first flip-flop circuit on conductor 42 is presented by a conductor 80 to one input of a NOR gate 82 and the inverted output of the first flip-flop circuit on conductor 44 is presented by a conductor 84 to one input of a NOR gate 86. The other input of both NOR gate 82 and NOR gate 86 are connected by a conductor 88 to the inverted output of the second flip-flop circuit appearing on the conductor 74. The non-inverting output of the second flip-flop circuit appearing on conductor 72 is connected by a conductor 90 to the one input of a NOR gate 92 and to one input of a NOR gate 94 by a conductor 96.

The output of NOR gate 86 is connected by a conductor 100 to one input of a NOR gate 102. Conductor 100 is also connected by way of a conductor 104 and a resistor 106 to the base of an NPN transistor 108. Transistor 108 will become conductive whenever the output of NOR gate 86 is a logical "1" and will become non-conductive whenever the output of NOR gate 86 is a logical "0". Conductor 104 is also connected by a conductor 110 to the input of an inverter 112, which has its output connected by conductor 114 to one input of a NOR gate 116.

The output of NOR gate 82 is connected by a conductor 120 to the input of an inverter 122 having its output connected by a conductor 124 to one input of a NOR gate 126. The other terminals of NOR gates 116 and 126 are connected by conductor 128 to the auto focus terminal 14. It is seen that as the auto focus signal changes from a "0" signal to a "1" signal and back during a scan, NOR gates 116 and 126 will receive the signals and will change states or not depending upon the outputs of NOR gates 82 and 86 which are representative of the conditions of the window and sync switches.

The output of NOR gate 116 is connected by a conductor 130 through a resistor 132 to the base of an NPN transistor 134. Transistor 134 will become conductive whenever the output of NOR gate 116 is a logical "1" and will become non-conductive whenever the output of NOR gate 116 is a logical "0".

The output of NOR gate 126 is connected by a conductor 136 to one input of a NOR gate 138 and by a conductor 140 through resistor 142 to the base of an NPN transistor 144. Transistor 144 will become conductive whenever the output of NOR gate 126 is a logical "1" and will become non-conductive whenever the output of NOR gate 126 is a logical "0". The emitter of transistor 144 is connected to signal ground while the collector is connected through a resistor 146 to the base terminal of a PNP transistor 148. The base of transistor 148 is connected by a conductor 150 to the base and collector terminals of a PNP transistor 152. The emitters of transistors 148 and 152 are connected through resistors 153 and 154, respectively, to the system source of positive potential. The collector of transistor 148 is connected by a conductor 155 to the base of an NPN transistor 156. The transistors 148 and 152 are substantially identical and when connected as shown, operate as a current "mirror", which is well known in the state of the art. As such, transistor 148 acts as a constant current source when it is in a conductive state for the supply of a signal to the transistor 156. When such a signal exists, transistor 156 will become conductive and when such signal disappears, transistor 156 will become non-conductive.

NOR gate 138 is connected to NOR gate 102 in the upper middle part of FIG. 5 in a flip-flop arrangement whereby the output of NOR gate 138 on conductor 160 is connected by a conductor 162 to the other input of NOR gate 102, while the output of NOR gate 102 on conductor 164 is connected by a conductor 166 to the other input of NOR gate 138. Conductor 164 is connected to one input of a NOR gate 170 and conductor 160 is connected to one input of a NOR gate 172. The output of NOR gates 170 and 172 are connected by conductors 174 and 176, respectively, to one input of a NOR gate 178 and a NOR gate 180, respectively. NOR gates 178 and 180 are again connected in flip-flop fashion with the output of NOR gate 178 on conductor 182 being connected by a conductor 184 to the other input of NOR gate 180 and the output of NOR gate 180 on conductor 186 being connected by a conductor 188 to the other input terminal of NOR gate 178.

The outputs of NOR gates 178 and 180 on lines 182 and 186 are connected to the one input terminal of a NOR gate 190 and a NOR gate 192, respectively. The outputs of NOR gates 190 and 192 on conductors 194 and 196, respectively, are connected to the base of an NPN transistor 200 and to the base of an NPN transistor 202, respectively. As will be explained later in detail, transistors 200 and 202 operate to control the motor circuitry for the motor which drives the lens of the system to a focus position. The direction of drive is either from "far" to "near" as will occur when the output of NOR gate 190 is a logical "1" which causes transistor 200 to become conductive or it will be from "near" to "far", which will occur when the output of NOR gate 192 is a logical "1", which causes transistor 202 to become conductive. The circuit operates so that the outputs of NOR gates 190 and 192 do not both have a logical "1" at the same time.

The collector of transistor 200 is connected by a conductor 204 through a resistor 206 to the base of a PNP transistor 208. The emitter of transistor 200 is connected by a conductor 210 to the base of an NPN transistor 212. The collector of transistor 202 is connected by a conductor 214 through a resistor 216 to the base of a PNP transistor 218. The emitter terminal of transistor 202 is connected by a conductor 220 to the base of an NPN transistor 222. The collectors of transistors 208 and 222 are connected together at a junction 224 which is also connected to one terminal of the drive motor 226. The collectors of transistors 212 and 218 are connected together at a junction 228 which is also connected to the other terminal of drive motor 226. The emitters of transistors 208 and 218 are connected together at a junction 230 which is also connected to the system source of positive potential. The emitters of transistors 212 and 222 are connected together at a junction 232 which is also connected to signal ground.

It can be seen that when transistor 200 is in a conductive state, then a current path is formed from the source of positive potential through junction 230, through the emitter base path of transistor 208 and through resistor 206, conductor 204, the collector emitter path of transistor 200, conductor 210, the base emitter path of transistor 212, and junction 232, to signal ground. This current flow causes transistors 208 and 212 to become conductive so that a larger current is caused to flow from the source of positive potential through junction 230, the base collector path of transistor 208, in a first direction from terminal 224 through motor 226 to terminal 228, the collector emitter path of transistor 212 and junction 232 to signal ground. The direction of current through motor 226 from left to right in FIG. 5 will cause the motor to drive the lens in a direction from "far" to "near" to achieve proper focus. When transistor 202 becomes conductive, then a current path is formed from the source of positive potential to junction 230, the emitter base path of transistor 218, resistor 216, conductor 214, the collector emitter path of transistor 202, conductor 220, the base emitter path of transistor 222 and junction 232 to signal ground. This current flow causes transistors 218 and 222 to become conductive, thereby providing a larger current flow from the source of positive potential through junction 230, the emitter collector path of transistor 218, and in a second direction from terminal 228 through motor 226 to terminal 224, the collector emitter path of transistor 222 and junction 232 to signal ground. The direction of current through motor 226 from right to left in FIG. 5 will cause the motor to drive the lens in the direction from "near" to "far" to achieve proper focus. For convenience, the word "near" has been placed above the output of NOR gate 190 in FIG. 5 to show that a "1" signal at this point will produce a drive from "far" to "near" and the word "far" has been placed above the output of NOR gate 192 to indicate that a "1" signal at this point will produce a drive from "near" to "far".

A source of reference potential for the system is shown in the lower middle portion of FIG. 1 comprising an NPN transistor 240 with its collector connected by a conductor 242 to the source of positive potential for the system. The emitter of transistor 240 is connected to a junction point 244 and through a resistor 246 to signal ground. The base of transistor 240 is connected by a conductor 248 to a junction point 250. A resistor 252 is connected between junction point 250 and the source of positive potential and a resistor 254 is connected between junction point 250 and signal ground. Transistor 240 is connected as an emitter follower and the circuit just described, with resistors 246, 252 and 254 properly chosen, causes a potential, $V_{REF}$ to appear at junction point 244 which is approximately half of the voltage of the source of positive potential for the system. Junction point 244 is connected by a conductor 260 through a resistor 262, a junction point 263, and a resistor 264, labelled "$R_M$" to signal ground. Junction point 263 is also connected to terminal 19 by a conductor 265. The potential at junction point 263, $V_M$, will be somewhat below the reference voltage, $V_{REF}$, depending on the values chosen for resistors 262 and 264, and as will be explained later in greater detail, provides a signal into the system even when the lens or optical member being focused is in the correct position. This signal, in the form of a minimum drive pulse width, allows static friction of the lens or optical member being positioned to be overcome. If desired, resistor 264 may be made variable so as to provide for adjustment of the minimum pulse width.

The emitter of previously described NPN transistor 108 is connected by a conductor 266 to the conductor 260 and thus to the reference potential. The collector of transistor 108 is connected by a conductor 268 to a junction point 270. A capacitor 272 labelled "$C_F$", is connected between junction point 270 and signal ground and a resistor 274 labelled "$R_F$" is connected between junction point 270 and the source of positive potential for the system. The collector of transistor 108 is also connected by a conductor 276 to the positive input terminal of an amplifier 278. The output of amplifier 278 is connected by a conductor 280 to the emitter of the previously described transistor 156. The collector of transistor 156 is connected by a conductor 282 to the minus input terminal of amplifier 278. The collector of transistor 156 is also connected by a conductor 284 to a junction point 286 and by a conductor 285 to terminal 17. A capacitor 288 labelled "$C_N$" is connected between junction point 286 and signal ground. The collector of transistor 156 is also connected by a conductor 290 to a junction point 292. The collector of previously described transistor 134 is connected by conductor 294 to junction point 292 and the emitter of transistor 134 is connected by a conductor 296 to the conductor 260 and thus to the source of reference potential. Junction point 292 is also connected by a conductor 298 to the minus input terminal of an amplifier 300.

Junction point 286 just above capacitor 288, $C_N$, is connected by a resistor 302 labelled "$R_N$" and a conductor 304 to the collector of a PNP transistor 306, the emitter of which is connected by a conductor 308 to the source of positive potential for the system. The base of transistor 306 is connected via a resistor 310 and a conductor 312 to the junction between previously described inverter 112 and NOR gate 116.

An amplifier 320 is shown in the lower right hand portion of FIG. 1 having its positive input terminal connected to the junction 263 between resistors 262 and 264 and thus will receive the potential $V_M$ thereon. The minus input terminal of amplifier 320 is connected by a conductor 322 to a junction point 323 and from junction point 323 to the positive terminal of amplifier 300. The output of amplifier 320 is connected by a conductor 324 to the other inputs of previously described NOR gates 190 and 192.

The output of amplifier 300 is connected by a conductor 330 to one input of a NOR gate 332 and the output of NOR gate 332 is connected by a conductor 334 to the other input terminal of previously described NOR gate 94. The output of NOR gate 94 is connected by a conductor 336 to the other input of NOR gate 332 and by a conductor 338 to the other input of previously described NOR gate 92.

The output of NOR gate 92 is connected by a conductor 340 to the input of an inverter 342, the output of which is connected to a junction point 344. Junction point 344 is connected by a conductor 346 to the other inputs of previously described NOR gates 170 and 172 and is also connected by a conductor 348 and a resistor 350 to the base of a PNP transistor 352. The emitter of transistor 352 is connected through a resistor 354 to the source of positive potential for the system. The base of transistor 352 is connected by a conductor 356 to the collector of transistor 352 and to the base of a PNP transistor 358. The emitter of transistor 358 is connected through a resistor 360 to the source of positive potential for the system and the collector of transistor 358 is connected by a conductor 361 to the junction point 323 and from junction point 323 by a conductor 362 to a junction point 364. A capacitor 366 labelled "$C_D$" is connected between junction point 364 and signal ground and a resistor 368 labelled "$R_D$" is connected in parallel with capacitor 366 between signal ground and a junction point 369 which is connected to junction 364. Junction point 369 is connected to terminal 18 by a conductor 370. As connected, transistors 352 and 358 constitute another current "mirror" and operate to supply a constant current to capacitor 366, $C_D$.

OPERATION OF THE CIRCUIT OF FIG. 5

Figure 6:
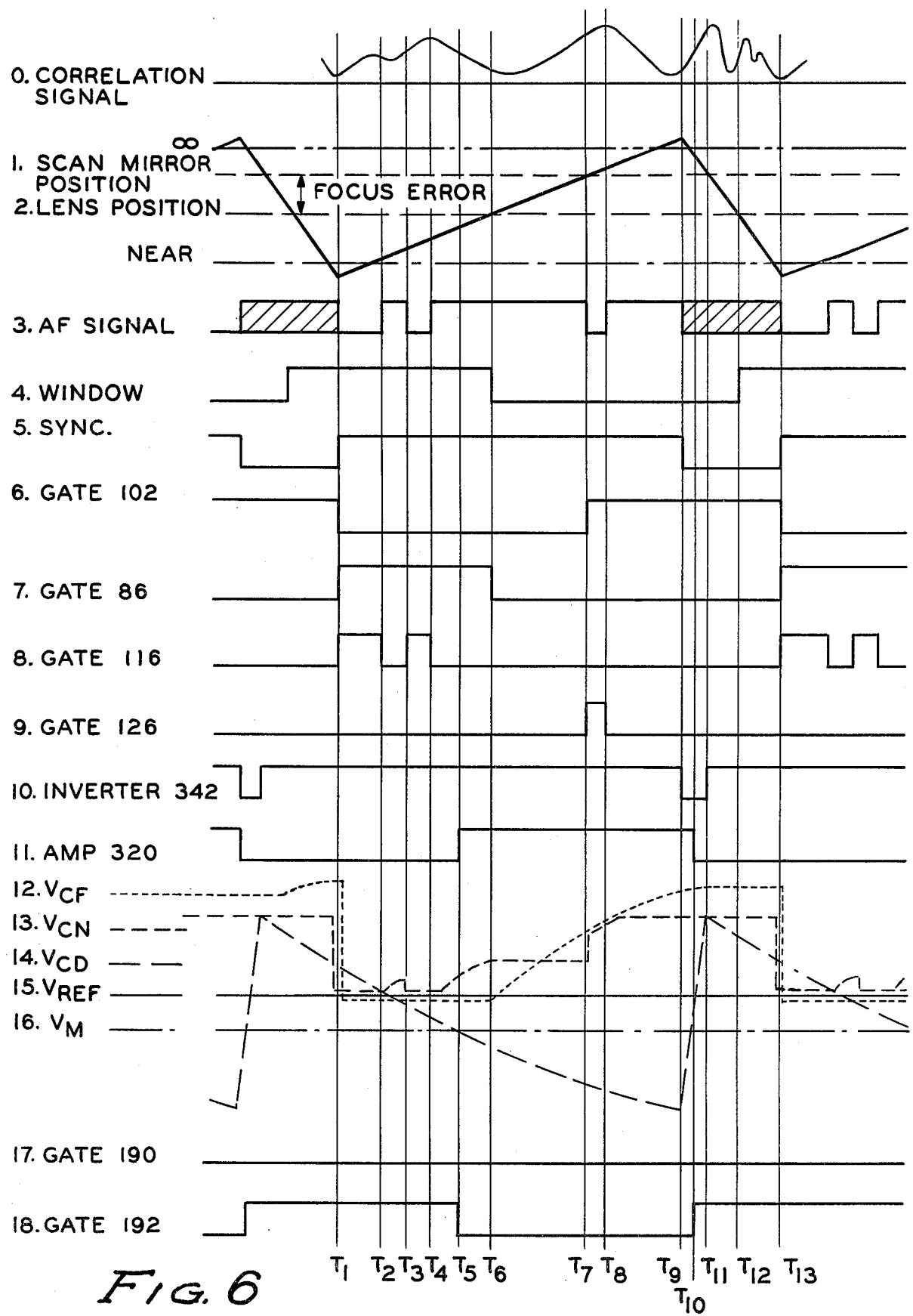
FIG. 6 shows the waveforms associated with the operation of the system of FIG. 5.

In considering the operation of the circuit of FIG. 5, reference should be had to FIG. 6, which shows a series of 19 graphs numbered 0 through 18 and vertically arranged so as to show the voltages and signals in the circuit of FIG. 5 at various times during a cycle. The vertical lines of FIG. 5 show 13 different time periods which have been chosen for the cycle at points where significant events occur.

Graph number 0 of FIG. 6 shows how the correlation signal, from a comparison of the radiation patterns entering the module 1 of FIG. 1 from mirrors 2 and 3, might vary during a scan. It is seen that a small correlation peak occurs at time $T_2$, another higher peak occurs at time $T_4$ and the final largest peak showing best correlation occurs at time $T_8$. At the end of the active scan at time $T_9$, the correlation peaks repeat in reverse order but are compressed by the fact that the return scan is at a higher rate than the active scan.

Graph number 1 of FIG. 6 is a solid saw-tooth line representative of the scan mirror position showing that the mirror travels from a position slightly closer than the nearest object expected to be focused upon at the "near" position to a position slightly beyond where it would be focused at the "far" position or infinity represented by "$\infty$". Superimposed on the saw-tooth scan mirror position is Graph number 2, a long dashed line indicative of the position of the lens which is to be positioned by the motor. It is seen in FIG. 6 that the lens position is a little less than half way between the "near" and "far" or "$\infty$" positions of the scan mirror.

Graph number 3 shows the variations presumed for the auto focus or "AF" signal. The AF signal, as explained in connection with FIGS. 3, 4a and 4b changes from a "1" to a "0" each time the correlation circuitry detects that a peak in the correlation signal is approaching and which changes from a "0" to a "1" whenever the correlation circuitry determines that a new peak has been reached. In FIG. 6, it has been presumed that the correlation signal has three distinct peaks in the scan from near to far, the first occurring at time $T_2$, the second at time $T_4$, and the third at time $T_8$, and these are the times in Graph number 3 when the AF signal changes from "0" to "1". The AF signal then remains a "1" until the correlation signal rises to a value above the previous peak indicating that a new peak is approaching. In this manner, the last and highest peak is held at a "1" until the end of the active scan. It is seen that the first two peaks occur at times before the scan mirror has reached a position corresponding to the lens position; i.e., time $T_6$, and the last peak occurs when the scan mirror is at a position corresponding to about half way between the present lens position and the far or infinity position. The cross hatched portions of Graph number 3 show that it makes no difference to the circuit of FIG. 5 what the AF signal is.

Graph number 4 is representative of the signal produced by the "window" or relative position switch or with reference to FIG. 5, the signal which appears at terminal 10 and identified with the "W". It is seen that the window switch is a "1" at the beginning of the scan and traverses from "1" to "0" at time $T_6$ when the scan mirror crosses a position corresponding to the present lens position.

Graph number 5 is representative of the signal produced by the sync switch or with reference to FIG. 5, the signal appearing on terminal 12 identified by an "S". It is seen that the sync switch becomes a "1" at the beginning of the scan when the mirror is in the slightly closer than "near" position and becomes a "0" when the mirror has finished its scan at the slightly further than "$\infty$" position.

Graph number 6 represents the output of NOR gate 102 in FIG. 5 and is seen to become a "0" at the start of the scan but changes to a "1" at time $T_7$, which corresponds to the time when the auto focus signal of Graph 3 last changes from a "1" to a "0" indicating that a peak is approaching.

Graph number 7 is representative of the output of NOR gate 86 of FIG. 5 and, as can be seen in FIG. 6, becomes a "1" at the beginning of the scan and becomes a "0" at time $T_6$, which represents the time when the scan mirror position corresponds to the lens position in the scan.

Graph number 8 represents the output of NOR gate 116 and it can be seen that this is a "1" at the beginning of the scan, becoming a "0" for the first time at time $T_2$, when the auto focus signal of Graph 3 first became a "1" indicating that a peak had been reached. The output of gate 116 thereafter changes to a "1" again at time $T_3$, which corresponds to the time when the auto focus signal of Graph 3 changes from a "1" to a "0", indicating that another peak is approaching. Finally, the output of NOR gate 116 changes from a "1" to a "0" at time $T_4$, which corresponds to the last time the auto focus signal of Graph 3 moves to a "1" position prior to "window" switch closure and indicating that another peak has been reached.

Graph number 9 shows the output of NOR gate 126 and, as can be seen in FIG. 6, this remains at "0" from the start of the scan until time $T_7$, when it changes to a "1". Time $T_7$ corresponds to the last shift from a "1" to a "0" in the auto focus signal of Graph 3 during the active scan. The output of gate 126 again shifts to a "0" at time $T_8$ indicative of the fact that the auto focus signal of Graph 3 has now moved to a "1", showing a new and, in this case, final, peak has been reached.

Graph number 10 indicates the output of inverter 342 of FIG. 5 and, as can be seen from FIG. 6, is a "1" from the beginning of the scan until time $T_9$, which corresponds to the closing of the sync switch of Graph 5 and is indicative of the end of the active scan of the mirror. The output of inverter 342 becomes a "1" again at time $T_{11}$, indicative of the fact that the voltage on capacitor 366, $V_{CD}$, has been charged to a value corresponding to the voltage on capacitor 288, $V_{CN}$, as will be explained in greater detail hereinafter.

Graph number 11 shows the output of amplifier 320 of FIG. 5 and, as can be seen from FIG. 6, is a "0" until it changes to a "1" at time $T_5$, representative of the fact that the voltage on capacitor 366, $V_{CD}$, has discharged to a value equal to the voltage across resistor 264, $V_M$, as will be explained in greater detail hereinafter. The output of amplifier 320 in Graph 11 then remains at "1" until it changes to a "0" at time $T_{10}$ representative of the fact that voltage on capacitor 366, $V_{CD}$, has been charged to a value slightly greater than the voltage across resistor 264, $V_M$, as will be explained in greater detail hereinafter.

Graphs 12, 13, 14, 15 and 16 represent voltages appearing at various points in the circuit of FIG. 5.

Graph number 12 is a small dashed line graph identified by a reference numeral 401 and is indicative of the voltage $V_{CF}$ across capacitor 272. $V_{CF}$ is seen in FIG. 6 to drop to the level of the reference voltage, $V_{REF}$ of Graph 15, at the beginning of the cycle and begins charging up with the closure of the window switch at time $T_6$.

Graph number 13 is a larger dashed line graph identified by reference numeral 403 and represents the voltage on capacitor 288, $V_{CN}$. It is seen that $V_{CN}$ also drops to the reference voltage at the beginning of the cycle but begins charging up each time the auto focus signal goes from a "0" to a "1" prior to window switch closure and moves back down to the reference voltage whenever the auto focus signal goes from a "1" to a "0" prior to window switch closure. When the window switch closes at time $T_6$, the voltage on capacitor 288, $V_{CN}$, is held at its then value until such time as a new peak is seen to be aproaching; i.e., at time $T_7$. At time $T_7$, $V_{CN}$, is changed to the voltage which then exists on capacitor 272, $V_{CF}$, and then charges along with this latter capacitor until time $T_8$, when the auto focus signal of Graph 3 indicates that, in this case, the final peak has been reached. The voltage $V_{CN}$ thereafter remains constant for the remainder of the cycle.

Graph number 14 is shown as largest dashed line graph identified by reference numeral 405 and is representative of the voltage appearing on capacitor 366 $V_{CD}$. It is seen that this voltage has previously been brought to the level of $V_{CN}$ prior to the starting of the cycle and is discharging at the time the sync switch opens and the scan mirror begins to move. $V_{CD}$ continues discharging throughout the entire cycle achieving a voltage equal to that across resistor 264, $V_M$, at time $T_5$. At the end of the cycle, $T_9$, capacitor 366 is rapidly charged to the voltage $V_{CN}$ which exists on capacitor 288 for the beginning of the next cycle.

Graph number 15 is a straight line identified by reference numeral 407 and is indicative of the magnitude of the reference voltage $V_{REF}$ at junction point 244 in FIG. 5. This remains constant throughout the cycle.

Graph number 16 is a dash-dot line identified by reference numeral 409, $V_M$, and represents the magnitude of the voltage $V_M$ across resistor 264 in FIG. 5. As explained, this voltage is a little below the voltage appearing at junction point 244, $V_{REF}$, for purposes of providing a small signal to the motor even at a balanced focus condition.

Graph number 17 shows the output of NOR gate 190 of FIG. 1 and, as can be seen in FIG. 6, is a "0" throughout the entire cycle for the situation which has been chosen to be described herein.

Graph number 18 shows the output of NOR gate 192 of FIG. 5 and it is seen that this is a "1" from some time prior to the start of the scan until time $T_5$, when the voltage on capacitor 366, $V_{CD}$, reaches the voltage $V_M$ across resistor 264. The motor 226 of FIG. 5 drives in a direction towards infinity or from "near" to "far" whenever a "1" signal appears at the output of NOR gate 192 and would drive from "far" to "near" in the event of a "1" output from NOR gate 190. In the present case, however, there is no "1" output on gate 190 during the entire cycle so motor 226 of FIG. 1 is energized to drive towards infinity until time $T_5$ and thereafter is not energized until time $T_{10}$, at which time the output of NOR gate 192 is again a "1", representative of the fact that the voltage on capacitor 366, $V_{CD}$, has again achieved the level of the voltage $V_M$.

Using FIGS. 5 and 6, the operation of the circuit of FIG. 5 will be described in detail for the complete cycle shown. It is seen in FIG. 6 that at a time just prior to the start of the cycle at $T_1$, the auto focus signal is probably a "0", although its magnitude its irrelevant until the scan begins, the window switch has been opened so that a "1" signal exists at terminal 10, the sync switch has been closed so that a "0" signal exists at terminal 12, the output of gate 102 is a "1", the output of gate 86 is a "0", the output of gate 116 is a "0", the output of gate 126 is a "0", the output of inverter 342 is a "1", the output of amplifier 320 is a "0", the output of gate 190 is a "0", and the output of gate 192 is a "1", indicating that the motor is still driving from "near" towards "far" from the last cycle.

At time $T_1$, the auto focus signal appearing on terminal 14 of FIG. 1 is a "0" and this signal is presented to the upper input terminals of both NOR gates 116 and 126. The window switch is open so that a "1" signal exists on terminal 10 and this "1" signal is presented to the upper input terminal of NOR gate 22 and to the input terminal of inverter 24. The output of inverter 24 will thus be a "0" at time $T_1$. The sync switch opens at time $T_1$, thus producing a "1" signal at terminal 12, which signal is presented to the upper terminal of NOR gate 52 and to the input of inverter 54. A "0" signal therefore appears on line 60 at the output of inverter 54. The arrangement of signals in the cross-coupled flip-flops comprising inverters 24 and 54 and NOR gates 22, 28, 32, 36, 52, 58, 62 and 66, at time $T_1$, is as follows: the output of NOR gate 22 is a "0", the output of NOR gate 28 is a "1", the output of NOR gate 32 is a "0", the output of NOR gate 36 is a "0", the output of NOR gate 52 is a "0", the output of NOR gate 38 is a "0", the output of NOR gate 62 is a "1" and the output of NOR gate 66 is a "0". These signals cause the cross-coupled flip-flops to be in a stable condition with a first output on line 44 representative of the condition of the window switch being open and a second output on line 74 representative of the condition of the sync switch being open. Although the cross-coupled flip-flops are presently stable, a zero signal upon terminal 10, as occurs at time $T_6$, will switch the output on line 44 to a "1". Similarly, a "0" signal on terminal 12, as occurs at time $T_9$, will change the signal on line 74 to a "1". Furthermore, it is the very first closure of the window and sync switches which produces the pulse causing the flip-flop to operate so that any bouncing of the switch contacts that may occur thereafter will have no effect on the outputs at conductors 44 and 74, respectively.

Since conductors 44 and 74 both carry "0" signals, the output of NOR gate 86 is a "1". This "1" signal is presented as one input to NOR gate 102, to the input of inverter 112, and to the base of transistor 108, which is thereby turned to an "ON" condition. When transistor 108 is turned on, the reference voltage $V_{REF}$, which appears at terminal 244, will be presented through transistor 108 to the plus terminal of amplifier 278 and also to the capacitor 272, $C_F$, thereby making $V_{CF}$ equal to the reference voltage, as is seen by dotted line 401 in Graph 12 of FIG. 5.

Since the output of NOR gate 28 is a "1" and the signal on line 74 is a "0", the inputs to NOR gate 82 are a "1" and a "0", respectively, thereby producing a "0" signal at the output on conductor 120. This signal, operating through inverter 122, places a "1" signal on line 124, which forms the lower input signal for NOR gate 126.

As mentioned, the input to inverter 112 is a "1" at time $T_1$ and, accordingly, the output thereof on line 114 is a "0". Since at time $T_1$ the auto focus signal on terminal 14 is a "0", the inputs to NOR gate 126 are a "0" and a "1", respectively, while the inputs to NOR gate 116 are a pair of "0's". The output of NOR gate 126 on conductor 136 will therefore be a "0" and this signal is presented to the lower input terminal of NOR gate 138 and through conductor 142 to the base of transistor 144, thereby causing this transistor to be in an "OFF" condition. The output of NOR gate 116 is a "1" which signal is presented through resistor 132 to the base of transistor 134, thereby turning this transistor to an "ON" condition. Whenever transistor 134 is turned on, the reference voltage $V_{REF}$ on terminal 244 will be conducted through transistor 134 to junction point 292 and from junction point 292 via conductor 298 to the input signal to the minus terminal of amplifier 300, via conductors 290 and 284 to capacitor 288 thereby making $V_{CN}$ equal to $V_{REF}$, as seen in Graph 13 of FIG. 6, and also via conductors 290 and 282 to the minus terminal of amplifier 278. It should be noted, however, that since transistor 144 above is turned off at time $T_1$, the current mirror formed by transistors 148 and 152 produce no current to the base of transistor 156 and, accordingly, this transistor is turned off. It therefore makes no difference what the output of amplifier 278 might be since it is not connected to the rest of the circuit. It should also be noticed that at such time as transistor 156 becomes conductive, then amplifier 278 is connected to operate as a voltage follower and the voltage appearing on the positive terminal of amplifier 278 will be the output signal on line 280, which signal will be conducted through transistor 156, to the minus input terminal of amplifier 300. Transistor 134 will always be turned off when transistor 156 is turned on. Actually, transistor 156 is only on during a short period of time between $T_7$ and $T_8$, as will be explained.

It should also be noticed that the "0" output from inverter 112 is presented by a conductor 312 and resistor 310 to the base of transistor 306, thereby turning this transistor to an "ON" condition. When transistor 306 is on, the positive signal from the system source is conducted through transistor 306 to one side of resistor 302. Junction point 286 is, however, tied to the reference voltage by virtue of the fact that transistor 134 is on, as explained above.

As was indicated above, the output of NOR gate 86 on conductor 100 is a "1" at time $T_1$ and, accordingly, regardless of the other input to NOR gate 102, the output of NOR gate 102 must be a "0". This "0" signal appears on conductor 164 as one of the inputs to NOR gate 170 and appears through conductor 166 as the other of the inputs to NOR gate 138. Since, as previously mentioned, the output of NOR gate 126 on conductor 136 is, at time $T_1$, a "0", NOR gate 138 has a pair of "0" signals as its inputs and thereby has a "1" output signal appearing on conductor 160 which is presented both to the upper terminal of NOR gate 172 and to the lower terminal of NOR gate 102. The output signals on conductors 164 and 160 are indicative of the direction which the motor must turn in order to bring the lens or primary optical element into the correct focus position. More specifically, as will be seen, until the time of operation of the window switch, the output of NOR gate 102 will continue to be a "0" while the output of NOR gate 138 will continue to be a "1". This condition will also exist after the time of window switch closure if there are no further transitions of the signal on the auto focus input terminal 14 indicative of a peak occurring after window switch closure. Thus, if there are no further auto focus signals after window switch closure, the "0" signal on line 164 and the "1" signal on line 160 will operate to cause the motor to drive the lens towards the near position. On the other hand, if an auto focus signal occurs after window switch closure on line 14 as occurs in the present example at time $T_7$, the output of NOR gate 102 on conductor 164 will become a "1" and the output of NOR gate 138 on conductor 160 will become a "0". Then when the motor is caused to drive, it will drive in a direction to move the lens or other primary optical element towards the "far" or infinity position.

It is seen from Graph 14 that the voltage on capacitor 366, $V_{CD}$, still is at a higher level at time $T_1$ than the reference voltage $V_{REF}$ of Graph 15. Because of this, the voltage on the positive terminal of amplifier 300 via conductor 362 will be higher than the voltage on the negative terminal of amplifier 300 via conductors 260, 296, transistor 134 and conductor 298. Amplifier 300 is a voltage comparator and whenever the signal on the positive input terminal is greater than the signal on the negative input terminal, a hard positive of "1" signal will appear at its output on conductor 330. On the other hand, should the voltage on the negative terminal of amplifier 300 exceed the voltage on the positive terminal, then the output on conductor 330 will be a large negative or "0" signal. At time $T_1$, however, with the voltage on the capacitor 366 being larger than the reference voltage, the output of amplifier 300 on conductor 330 will be a "1".

Moving back over to the left hand portion of the drawing, it was previously indicated that the output of NOR gate 58 at time $T_1$ was a "1" and this signal is presented by conductors 72 and 90 to the upper input of both NOR gate 92 and NOR gate 94. With a "1" input to NOR gate 94, its output on conductor 338 will be a "0", which signal is presented to the lower input of NOR gate 92 and to the upper input of NOR gate 332. NOR gate 332 therefor has a "0" and a "1" as its inputs, thereby producing a "0" output on conductor 334, which is presented to the lower input terminal of NOR gate 94.

With NOR gate 92 having a "1" and a "0" as its inputs, the output thereof on conductor 340 will be a "0" which is presented to inverter 342, causing its output at terminal 344 to be a "1". This "1" signal on terminal 344 is presented by a conductor 346 to the lower inputs of NOR gates 170 and 172, respectively, and via conductor 348 and resistor 350 to the base terminals of transistors 352 and 358, both of which are thereby placed in an "OFF" condition. Accordingly, the current mirror formed by transistors 352 and 358 does not produce an output and capacitor 366, $C_D$, will not be charged from the plus voltage source but rather will continue to drain through resistor 368, $R_D$.

As previously mentioned, the output of NOR gate 102 is a "0" at time T₁, while the output of NOR gate 138 on conductor 160 is a "1". As also previously mentioned, the signal on conductor 346 is a "1" at time T₁ and, therefore, the NOR gate 170 has a "0" and a "1" as input signals, causing its output on conductor 174 to be a "0". Likewise, NOR gate 172, having a pair of "1" signals as its input, produces a "0" output on conductor 176. These two "0" signals are presented to a flip-flop composed of NOR gates 178 and 180. The output of NOR gate 178 is a "1" at time T₁, while the output of NOR gate 180 is a "0" at this time. This then readies the flip-flop for a change of state should the output of NOR gate 170 ever change from a "0" to a "1" which in the example chosen does not occur. Thus, the output of NOR gate 178 on line 182 is continuously a "1" which forms the input to NOR gate 190 and with a "1" as one of its inputs, the output on line 194 from NOR gate 190 is continuously a "0" which causes transistor 200 to be in an "OFF" condition. As long as transistor 200 is turned off, the motor 226 will not turn in a direction from "far" to "near" as will be further explained hereinafter. Meanwhile, the "0" output from NOR gate 180 forms the upper input to NOR gate 192. Thus, whenever the other input to NOR gate 192 coming from amplifier 320 via conductor 324 is a "0", the output of NOR gate 192 will be a "1" on line 196, thereby turning transistor 202 to an "ON" condition. The output of amplifier 320 will be a "0" whenever the signal on its negative terminal is greater than the signal on its positive terminal. Except when an inhibit signal is presented on terminal 19, raising the voltage on the plus terminal of amplifier 320 so as to prevent a "0" output therefrom and thus prevent operation of the motor, as will be hereinafter described, the signal on the positive terminal of amplifier 320 is the fixed voltage $V_M$, which is set by the values of resistors 262 and 264 somewhat lower than the reference voltage. It can also be seen that the voltage on the negative terminal of amplifier 320 is derived from the voltage, $V_{CD}$, on capacitor 366 which, as seen in Graph 14 of FIG. 6, is higher than the voltage on the plus terminal of amplifier 320, $V_M$, as seen in Graph 16 until time T₅. Accordingly, until such time as capacitor 366 has discharged through resistor 368 to a value slightly below that of $V_M$ across resistor 264; i.e., time T₅ the output on conductor 324 will be a "0" and transistor 202 will continue to be turned on so that the motor drives toward "far".

As was previously explained, transistor 202 is turned on, a circuit is created from the source of positive potential through junction 230, the emitter base junction of transistor 218, resistor 216, conductor 214, the collector emitter junction of transistor 202, conductor 220, the base emitter junction of transistor 222 and junction 232 to signal ground. This causes transistors 218 and 222 to be in a conducting state and a signal is therefore applied from the positive source of potential through junction 230, the emitter collector junction of transistor 218, through motor 226 from junction 228 to junction 224, through the collector emitter junction of transistor 222 and junction 232 to signal ground. The direction of current flow from junction 228 through motor 226 to junction 224 is such as to cause motor 226 to move the lens towards the "far" or infinity position. Although it does not occur in the present example, should the desired focus position be more towards the near position, transistor 202 would be turned off and transistor 200 would be turned on, thereby setting up a circuit similar to that described above but wherein the signal flowing through motor 226 would be from junction point 224 to junction point 228. Under these circumstances, the motor would turn in the opposite direction toward the "near" end of its range.

All of the above represents the situation as it occurred at time T₁ and in the discussion to follow at times T₂ through T₁₃ only the significant changes that occur in the circuit will be discussed.

At time T₂, the only change that occurs is that the auto focus signal appearing on junction 14 changes from a "0" to a "1", thereby placing a "1" signal on the upper inputs of NOR gates 116 and 126 respectively. Since the lower input of NOR gate 126 previously had a "1" signal thereon, the output of NOR gate 126 will not change but since the previous inputs to NOR gate 116 were both "0's", the output appearing on conductor 130 will change from a "1" to a "0". This has the effect of turning transistor 134 to an "OFF" condition. When transistor 134 is off, capacitor 288, $C_N$, which was previously tied to the reference voltage through transistor 134, can now begin charging from the positive source voltage through transistor 306 and resistor 302, $R_N$. This is seen in FIG. 6 as the rising of voltage of the dashed line 403 starting at time T₂ and going toward time T₃.

The negative terminal of amplifier 300 is likewise no longer tied to the reference voltage but now has, as an input, the voltage $V_{CN}$ which exists on capacitor 288 which, as mentioned, is beginning to rise. The voltage on capacitor $C_D$, which forms the signal at the positive input terminal of amplifier 300, is seen to be falling to a level where is crosses the voltage rising on capacitor 288, $C_N$, sometime during the period between T₂ and T₃. When it does so, the output of amplifier 300 will then change to a "0", since the signal at the negative terminal will exceed the signal at the positive terminal. While a "0" signal on conductor 330 causes NOR gate 332 to produce a "1" output, this has no effect on the output of NOR gate 94, since the signal on conductor 96 is still a "1". Thus, the input to NOR gate 92 does not change between times T₂ and T₃.

At time T₃, the only change which occurs is that the auto focus signal again goes from a "1" to a "0", and thus the upper inputs of NOR gates 116 and 126 are again receiving "0" signals as was the case at time T₁. Thus, at time T₃, the only change occurring is that the output of NOR gate 116 changes back to a "1", thereby turning transistor 134 on and, again, dropping the voltage on capacitor 288, $C_N$, back to the reference potential, as can be seen by the dashed line 403 dropping back to $V_{REF}$ at time T₃ in FIG. 6. Also, when transistor 134 becomes conducting again, the negative input terminal of amplifier 300 again becomes that of the reference voltage and since, by this time, the voltage $V_{CD}$ on capacitor 366 has fallen below the voltage $V_{REF}$, the signal at the negative input terminal of amplifier 300 continues to be greater than the signal at the positive input terminal thereof, so that the output of amplifier 300 continues to be a "0" and no change occurs in the circuitry thereafter.

At time T₄, the only change occurring is that the auto focus signal appearing on terminal 14 again goes from a "0" to a "1", indicating that another peak in the correlation signal has been reached. As was the case at time T₂, this causes a "1" signal to appear on the upper inputs of NOR since the upper input of NOR gate 192 is receiving a "0" signal, the ouput of NOR gate 192 now changes from a "1" to a "0", which has the effect of turning transistor 202 off and causing the motor 226 to stop being energized. As was brought out in the above-mentioned copending application, Ser. No. 804,111, motor 226 drives at a rate which is proportional to the pulse width of the input signal. The pulse width driving motor 226 is equal to the length of time NOR gate 192 has a "1" signal. This time, as seen from FIG. 6 in Graph 18, extends from a period somewhat before time $T_1$ until time $T_5$ and will vary with the amount of charge on capacitor 366, $C_D$, and the rate of decay thereof through resistor 368, $R_D$. This decay rate can be set by the choice of magnitudes for capacitor 366 and resistor 368 but, as will be seen hereinafter, the charge will vary with, in the present example, the time between the window signal transition from "1" to "0" and the last auto focus "0" to "1" transition. Actually, the voltage $V_{CN}$ on capacitor 288 is that which varies directly with the time between window switch closing and auto focus transition from "0" to "1" but as will be described, the voltage on capacitor 288 is transferred to capacitor 366 after the end of the scan. At any rate, as the magnitude of this voltage decreases, the speed of rotation of motor 226 will correspondingly decrease, thus producing the proportional drive which was descirbed in the above-mentioned copending application, Ser. No. 804,111.

It is also seen that the motor drives during both the active and the return portions of the scan and that if there is a large error, the voltage $V_{CD}$ on capacitor 366 may be high enough or the decay rate low enough that the motor will operate continuously during both portions of the scan.

At time $T_6$, the window switch closes causing a transition of the voltage at terminal 10 to go from a "1" to a "0". Even though the mechanical structure of the window switch may be such as to cause several bounces of the contacts and thus a series of "1" to "0" transitions and back, it is only the first impulse that has any effect on the cross-coupled flip-flop arrangement above-described. More specifically, as soon as terminal 10 receives a first "0" signal, it is presented to the upper input of NOR gate 22 whose lower input was already receiving a "0" signal. Thus, upon the first occurrence of a window switch "0" signal, the output of NOR gate 22 changes from a "0" to a "1". Since the lower input of NOR gate 28 is receiving a "0" signal at this time, the "0" output from NOR gate 22 causes NOR gate 28 to switch to a "0". This "0" signal is presented to the upper input of NOR gate 36 and to the lower input of NOR gate 52. However, since the upper input of NOR gate 52 is already receiving a "1" from sync switch terminal 12, its output will remain unchanged as a "0". However, since the output of NOR gate 32 on conductor 34 is a "0", the changed output of NOR gate 28 produces a pair of "0" signals as inputs to NOR gate 36 and thereby changes its output from a "0" to a "1". This changes the signal on conductor 44, which through conductor 84, forms the upper input signal to NOR gate 86. It also changes the signal to the lower input terminal of NOR gate 62 which, since it is still receiving a "0" signal from inverter 54 as its upper input, changes the output on conductor 64 from a "1" to a "0". This signal is presented to the lower input of NOR gate 66 but since the upper input of this NOR gate was previously receiving a "1", there is no change in the output of NOR gate 66 and thus the signal on conductor 74 remains at "0" and the lower inputs to NOR gate 82 and NOR gate 86 continue to be "0". Likewise, the unchanged "0" signal from NOR gate 66 is presented to the lower input of NOR gate 58, which, since it is still receiving a "0" signal from the output of NOR gate 52 as its upper input signal, continues to produce a "1" output on conductor 72 which via conductor 76 continues to produce a "1" signal on the lower input terminal of NOR gate 32 and via conductor 90 on the upper inputs of NOR gates 92 and 94. Thus, the outputs of NOR gates 32, 92 and 94 will remain unchanged at time $T_6$. The cross-coupled flip-flop arrangement is now stable but is set so that upon the occurrence of a "0" signal from the closure of the sync switch through terminal 12, it will operate to produce a "1" signal on conductor 74 in place of the "0" signal being presented to the lower input terminals of NOR gates 82 and 86. Since the inputs of NOR gate 86 are now a "1" and a "0", the output on conductor 100 will change from a "1" to a "0". This signal is presented to the upper input of NOR gate 102 but since the lower input of this NOR gate is a "1" from the output of NOR gate 138, there is no change in output of NOR gate 102 and the signal on conductor 164 remains a "0". The change to a "0" signal on conductor 100 changes the input to inverter 112 so that its output now becomes a "1" but this produces no effect on NOR gate 116 since at time $T_6$, the auto focus signal at terminal 14 remains at "1". The change to a "1" output from inverter 112 does not have the effect, however, of changing the input to the base of transistor 306 causing this transistor to return to an "OFF" condition. When this occurs, the path from the positive source of potential through transistor 306 and resistor 302, $R_N$, is opened and capacitor 288, $C_N$, stops charging and holds the last value it had attained. This is seen in FIG. 6 by the dashed line 403 which had been rising since time $T_4$ to time $T_6$, levelling off and holding horizontal between times $T_6$ and $T_7$.

The change in output of NOR gate 86 on conductor 100 from a "1" to a "0" also has the effect of changing the signal to the base of transistor 108, causing it to change to an "OFF" condition. With transistor 108 off, the upper terminal of capacitor 272, $C_F$, is no longer tied to the reference voltage $V_{REF}$ and consequently capacitor $C_F$ begins charging from the source of positive potential through resistor 274, $R_F$. This is seen in FIG. 6 by dotted line 401 representing $V_{CF}$ rising from time $T_6$ through the rest of the scan or until it equals the system potential.

The turning off of transistor 108 also has the effect of changing the signal applied to the positive input terminal of amplifier 278 but since its output is connected to the emitter of transistor 156 which continues to be in an "OFF" condition, the change has no effect. The output of amplifiers 300 and 320 remain the same as they were in "0" and "1" conditions, respectively, and, accordingly, there is no change in the motor's unenergized condition.

The change in output signal of NOR gate 28 on conductor 42 from a "1" to a "0" has one additional effect. The signal is presented to the upper input of NOR gate 82, which is still receiving at its lower input terminal a "0" signal from conductor 74 and thus the output of NOR gate 82 changes from a "0" to a "1" and this signal is presented to the inverter 122 whose output correspondingly changes from a "1" to a "0" and thus provides a change to the lower input of NOR gate 126. However, since the upper input of NOR gate 126 is still receiving a "1" signal from the auto focus terminal 14, there is no change in the output of NOR gate 126 and the signal on conductor 136 remains at "0".

It is seen that the major effective change that has occurred at time $T_6$, upon the closing the window switch, is that capacitor 288, $C_N$, stops charging and holds its last value, while capacitor 272, $C_F$, begins charging from $V_{REF}$ towards the supplying voltage. The effect of this will become apparent in further descriptions.

At time $T_7$, the auto focus signal on terminal 14 changes from a "1" to a "0". This changes the signal to the upper inputs of NOR gates 116 and 126, but since the lower input of NOR gate 116 continues to receive a "1" signal from the output of inverter 112, there is no change in the output of NOR gate 116 and the signal on conductor 130 remains at "0". The signal on the lower input of NOR gate 126, however, is a "0" so that the change of auto focus signal on terminal 14 causes the output of NOR gate 126 to change from a "0" to a "1". The "1" signal on conductor 136 is presented to the lower input of NOR gate 138 but since the upper input of NOR gate 138 continues to receive a "1" from the output of NOR gate 102, there is no change in output of NOR gate 138 and the signal on conductor 160 remains a "0". The change in signal to a "1" on conductor 136 is presented by a conductor 140 and resistor 142 to the base of transistor 144 and transistor 144 now turns on. When transistor 144 turns on, an emitter base current is established from the source of positive potential through resistor 154 and the emitter base junction of transistor 148, through resistor 146 and transistor 144 to signal ground. A proportional current is conducted from the source of positive potential through resistor 156 and the emitter base junction of transistor 152, conductor 150, resistor 146 and transistor 144 to signal ground. Thus transistors 152 and 148 become conductive and operate as a current mirror producing a fixed current from transistor 148 through conductor 154 to the base of transistor 156, thereby turning transistor 156 on. When transistor 156 is turned on, amplifier 278 is allowed to operate as a voltage follower and the signal which appears on the positive input terminal of this amplifier likewise appears at the output on conductor 280 and through transistor 156, conductors 290 and 298 to the negative input terminal of amplifier 300. The signal which appears on the positive terminal of amplifier 278 is the voltage $V_{CF}$ on the capacitor 272, since transistor 108 remains off. Thus, the voltage $V_{CF}$ on capacitor 272 is now transferred to the minus input of amplifier 300, since transistor 134 remains off but this does not change the output of amplifier 300 since the voltage $V_{CN}$ on capacitor 366 remains lower than the signal $V_{CF}$ on the negative input terminal of amplifier 300. Thus, the signal on conductor 330 remains a "0" and no change in the circuitry above that point occurs. The voltage $V_{CF}$ on capacitor 272 which now appears at the output of amplifier 278, is also presented via conductor 284 to the upper terminal of capacitor 288, $C_N$. Recalling that capacitor 288 was previously holding the voltage it had attained at time $T_6$, it is seen that its voltage now rises to the level of the output of amplifier 278 or, in other words, to the level of the voltage $V_{CF}$ of capacitor 272. This is seen in FIG. 6 as a rise of the dashed line 403 representing $V_{CN}$ from its horizontal holding position substantially vertically to the value of the dotted line 401. $V_{CN}$ continues to follow $V_{CF}$ between times $T_7$ and $T_8$. Thus, the voltage $V_{CN}$ on capacitor 288 is now of magnitude indicative of the time from window switch closure, $T_6$, to time $T_7$ and, later, time $T_8$.

At time $T_8$, a signal at terminal 14 from the auto focus circuitry changes from a "0" to a "1" and thus the signal to the upper inputs of NOR gates 116 and 126 become "1's". This has no effect on the output of NOR gate 116 since its lower input was already receiving a "1" signal from inverter 112 but the output of NOR gate 126, which was previously receiving two "0" signals will now change from a "1" to a "0". Thus the signal on conductor 136 becomes a "0", which has no effect on the output of NOR gate 138 but which, operating through conductor 140 and resistor 142, changes the signal to the base of transistor 144, thereby shutting it off. When transistor 144 turns off, transistors 148 and 152 also turn off changing the signal to the base of transistor 156 which now also turns off. When transistor 156 turns off, the voltage $V_{CN}$ on capacitor 288 has no place to go since transistor 306 remains off and, accordingly, this voltage is held at its last value. This is seen in FIG. 6 as a levelling off of the dashed line 403 representing $V_{CM}$ at time $T_8$.

It should be noted that time $T_8$ represents the last time the auto focus signal changes from a "0" to a "1" and this transition is representative of the last or major peak in the correlation signal and thus of the position of proper focus. It can be seen in Graphs 1 and 2 of FIG. 6 that the time between the closing of the window switch at $T_6$ until the time when the major correlation peak is encountered is representative of the focus error. It is also seen that the voltage $V_{CN}$ on capacitor 288 is being held at the voltage which capacitor 272, $C_F$, had achieved at time $T_8$ and is thus indicative of the magnitude of the time between $T_6$ and $T_8$ or, in other words, indicative of the focus error. Thus, it is the voltage $V_{CN}$ on capacitor 288 that will tell the system the magnitude of the focus error so that motor 226 can drive the lens or primary optical object toward correct focus position.

At time $T_9$, the scanning mirror has completed its scan from near to far and the sync switch closes producing a "0" signal at terminal 12 of FIG. 5.

As mentioned above, the closing of the mechanical sync switch may produce bouncing but with the cross-coupled flip-flops of FIG. 5, it is only the first closing that causes an output change. This is important in the present circuit since, as seen in the description so far, the times between the closing of switches and the achieving of auto focus signals is representative of the focus error and thus is quite critical. If the window or sync switch bouncing were not compensated, then the timing would be in possible error, with the resultant error in the focusing of the lens.

The first touching of the sync switch contacts produces a "0" signal at the upper input of NOR gate 52, which now is receiving two "0" input signals so that its output changes to a "1" on conductor 56. This presents a "1" signal to the upper input of NOR gate 58, which had previously been receiving two "0" input signals and, accordingly, the output of NOR gate 58 will change from a "1" to a "0" on conductor 72. This signal is fed by conductor 70 to the upper input of NOR gate 66, and by conductor 72 to conductor 90 and thus to the lower input of NOR gate 32 and to the upper inputs of NOR gates 92 and 94.

The "0" signal now appearing at terminal 12 is also presented to inverter 54 so that its output changes to a "1" on conductor 60. The output of NOR gate 62 does not change, however, since its lower input had previously been a "1" and, accordingly, the output on conductor 64 remains a "0". NOR gate 66 is, however, now receiving two "0" input signals so its output changes to a "1" on conductor 74 and this signal is fed to the lower input of NOR gate 58 and to the lower inputs of NOR gates 22, 82 and 86. The output of NOR gate 86 will not change since it was previously receiving a "1" signal at its upper input and, accordingly, the signal on conductor 100 will remain a "0". The output of NOR gate 22, which was previously receiving two "0" input signals, wll now change from a "1" to a "0", but this signal will have no effect on NOR gate 28, since it has been receiving a "1" signal at its lower input terminal. THus, the signal on conductor 80 to the upper input of NOR gate 82 will remain a "0". Since the inputs to NOR gate 82 have changed from two "0" signals to a "0" and a "1", the output of NOR gate 82 will change from a "1" to a "0" and the output of inverter 122 on conductor 124 will change from a "0" to a "1", as the lower input to NOR gate 126. The output of NOR gate 126 will not change, however, since the auto focus signal at its upper input terminal remains a "1".

The major change which occurs by the closing of the sync switch is the change on the upper input terminal of NOR gate 92 from a "1" to a "0". NOR gate 92 is now receiving two "0" signals and, accordingly, its output changes from a "0" to a "1", which when inverted by inverter 342 places a "0" signal at terminal 344 and via conductor 346 to the lower inputs of NOR gates 170 and 172. The output of NOR gate 170 will not change, however, since it is still receiving a "1" signal at its upper input but the output of NOR gate 172 will now change since it is now receiving two "0" input signals. Thus, the signal on conductor 176 changes from a "0" to a "1". This has no effect on the output of NOR gate 180, however, since the upper input terminal of this NOR gate is still receiving a "1". As a result, at time $T_9$, the outputs of NOR gates 190 and 192 do not change and the motor continues to be in an unenergized condition.

The "0" output from inverter 342 appearing on terminal 344 is presented by a conductor 348 and resistor 350 to the base terminals of transistors 352 and 358. This causes these transistors to turn on and a current path is established from the positive source of potential through resistor 360, the emitter collector junction of transistor 358 via conductors 361 and 362 to the upper terminal of capacitor 366, $C_D$. As previously mentioned, transistors 352 and 358 operate as a current mirror and the current flowing from collector of transistor 358 will be constant regardless of voltage changes, thus rapidly charging capacitor 366, $C_D$, up towards the supply potential. This is seen in FIG. 6 as the very rapid rise occurring in the voltage $V_{CD}$ on large-dashed line 405 between times $T_9$ and $T_{11}$. The effect of charging capacitor 366, $C_D$, will be to present a large signal at the positive terminal of amplifier 300 and at the negative terminal of amplifier 320, as will be seen.

At time $T_{10}$, the voltage $V_{CD}$ on capacitor 366 has risen to a point where it crosses the dot-dash line 409 representative of the voltage $V_M$. When this occurs, the voltage at the negative terminal of amplifier 320 equals and just exceeds the voltage at the positive terminal of amplifier 320 with the result that the output of amplifier 320 changes from a "1" to a "0" at time $T_{10}$. This signal is presented to the lower inputs of NOR gates 190 and 192 and, while it has no effect on the output of NOR gate 190 since the upper input of this NOR gate remains a "1", the output of NOR gate 192 will change from a "0" to a "1" by virtue of the fact that it now has two "0" signals as its inputs. Conductor 196, now carrying a "1" signal turns transistor 202 on and, as previously explained, causes motor 226 to drive in a direction from "near" to "far" or, in other words, towards the desired focus position.

At time $T_{11}$, the voltage $V_{CD}$ on capacitor 366 has risen to the point where it now equals the voltage being held on capacitor $C_N$ as is represented by the dashed line 403 of Graph 13 in FIG. 6. When this occurs, the voltage appearing on the positive terminal of amplifier 300 equals and just exceeds the voltage appearing on the negative terminal of this amplifier and, accordingly, the output of amplifier 300 changes from a "0" to a "1". This signal is presented by a conductor 330 to the lower input of NOR gate 332 and since the upper input of this NOR gate has been receiving a "0" signal, the output of NOR gate 332 switches from a "1" signal to a "0" signal. As soon as a "0" signal appears on conductor 334, NOR gate 94 will have two "0" input signals and its output appearing on conductor 338 will change from a "0" to a "1". At this time, since the two inputs to NOR gate have both been "0's", the change to a "1" at the lower input will cause the output of NOR gate 92 appearing on conductor 340 to change from a "1" to a "0" and, correspondingly, the output of inverter 342 appearing on junction point 344 changes from a "0" to a "1". This "1" signal at junction 344 is presented to the lower inputs of NOR gates 170 and 172 but the output of NOR gate 170 does not change since it has previously been receiving a "1" signal on its upper input. The output of NOR gate 172 which was previously receiving two "0" input signals now changes from a "1" to a "0" on conductor 176 but this has no effect on the output of NOR gate 180 since it had previously been receiving a "1" signal on its upper input. Accordingly, there is no change in the output of NOR gates 190 and 192 and motor 226 continues to turn in the direction from "near" to "far", as desired.

The change in the output signal from inverter 342 from a "0" to a "1" is presented by a conductor 348 and resistor 350 to the base of transistors 352 and 358, thereby turning them into an "OFF" condition. This prevents further charging of capacitor 366, $C_D$, and this capacitor now assumes a voltage which it last held; i.e., the voltage $V_{CN}$ that was on capacitor 288. This is seen in FIG. 6 as the junction point of the large dashed line 405 representing $V_{CD}$ and medium dashed line 403 representing $V_{CN}$. Capacitor 272, $C_F$, has continued charging continuously from the time it started but since transistor 156 has been off since time $T_8$, this voltage has had no effect.

The voltage $V_{CD}$ on capacitor 366 now begins discharging through resistor 368, $R_D$, and will do so approximately along a line shown by the first portion of large dashed line 405 between the times before time $T_1$ and time $T_9$ during the next cycle. However, each successive time the motor drives the primary lens towards a better focus position, the focus error decreases and the magnitude of the voltage on the capacitors will decrease until the desired focus position is reached. Even at this time, however, there will be a small voltage difference between the input to the amplifier 320 by virtue of the fact that even though the voltage $V_{CD}$ on capacitor 366 may approximately equal the reference voltage when there is no error, there will be a voltage between the two inputs of amplifier 320 due to the voltage drop from $V_{REF}$ to $V_M$ that occurs between resistors 262 and 264. The "0" output from amplifier 320 which results will then operate to produce an output "1" signal from either NOR gate 190 or 192, depending upon the direction that the focus is in error, and will thus turn on either transistor 200 or 202 so that motor 226 will be energized even though the pulse width may be very small. This has the advantage of overcoming the static friction of the servo system.

As soon as capacitor 366, $C_D$, starts discharging through resistor 368, $R_D$, the voltage at the positive terminal of amplifier 300 falls below the voltage at the negative terminal of this amplifier since the voltage $V_{CN}$ on capacitor 288 is being held until the sync switch closes again. As a result, the output of amplifier 300 changes from a "1" to a "0" again but this has no effect on the output of NOR gate 332 since the upper input of this NOR gate continues to receive a "1".

The final occurrence in the cycle is the reopening of the window switch at time $T_{12}$ which produces a "1" signal on terminal 10 in FIG. 5. This has the effect of resetting the cross-coupled flip-flops but has no other effect on the circuit.

Specifically, the "1" signal on conductor 20 is presented to the upper input of NOR gate 22 but since NOR gate 22 was previously receiving a "1" input at its lower input, there is no change in its output on conductor 26. The "1" signal on conductor 20 passed through inverter 24 produced a "0" signal on the upper input of NOR gate 32 and since this NOR gate now has two "0" signals as inputs, its output changes from a "0" to a "1" and this signal is fed to the lower input of NOR gate 36. NOR gate 36 had previously been receiving two "0" signals as its inputs so its output now changes from a "1" to a "0" on conductor 44 which signal is presented to the upper input of NOR gate 86 and to the lower input of NOR gate 62. The output of NOR gate 86 does not change since it had previously been receiving a "1" on its lower input and the output of NOR gate 62 does not change since it had previously been receiving a "1" on its upper input. The "0" signal on the output of NOR gate 36 does, however, change the input signal to the lower input of NOR gate 28 and since this NOR gate now receives two "0" signals as inputs, its output will change to a "1" on conductor 42. This signal is presented to the upper input of NOR gate 82 but since the lower input terminal had previously been receiving a "1", there is no output change from this NOR gate. The "1" signal on conductor 42 is also presented to the lower input of NOR gate 52 which had previously been receiving two "0" input signals so that its output now changes to a "0" on conductor 56. This does not effect the output of NOR gate 58 since the lower input of this NOR gate had previously been receiving a "1" signal.

At time $T_{13}$, which is the beginning of the next cycle, the sync switch reopens and the signal appearing on terminal 12 again becomes a "1" and the circuit is in the same situation it was at time $T_1$, previously described.

It should be noted that due to the ability to rapidly charge capacitor 366, $C_D$, from the current mirror and since the driving of the motor is independent of the charging of capacitors 272, $C_F$, and 288, $C_N$, it is possible to make the active scan; i.e., the time between sync switch opening at $T_1$ and the sync switch closing at $T_9$, larger than the return scan between $T_9$ and $T_{13}$. This allows the velocity of the scan mirror to be reduced during the active portion of the scan which will decrease the focus delay for improved low illumination operation.

In an actual embodiment of the present invention, the following circuit components of FIG. 5 may have the following values:
System potential—5.8 Volts
All NOR gates—CD-4001
All inverters—CD-4049
All amplifiers—RCA-3130
Resistors 26, 56, 132, 142, 106—20 K Ohms
Resistors 154, 156, 310—50 K Ohms
Resistor 146—1.8 K Ohms
Resistors 354, 206 and 125—100 Ohms
Resistor 360—50 Ohms
Resistor 350—75 K Ohms
Resistor 252—3.3 K Ohms
Resistor 254—5.6 K Ohms
Resistor 246—500 Ohms
Resistor 262—10 K Ohms
Resistor 274, RF—200 K Ohms
Resistor 302, RN—200 K Ohms
Resistor 368, RD—200 K Ohms
Resistor 29R, RM—3 K Ohms
Capacitor 272, CF—0.1 µf
Capacitor 288, CN—0.1 µf
Capacitor 366, CD—0.1 µf It is seen that the apparatus thus far described provides an improved continuous focus proportional controller which provides for continuous motor drive for large focus errors, has a large active duty scan and provides a minimum drive pulse width to overcome motor static friction as well as providing electronic debouncing of the window and sync switches. As described in connection with FIG. 2, however, it is seen that under very low contrast conditions or with very highly three dimensional subjects, the magnitude of the extremum in the correlation signal may not be very much different than other minor peaks in the signal and so this system, like other systems in the prior art, may have difficulty in low contrast conditions of finding the proper focus position for the desired subject. This condition frequently occurs in taking seascapes or landscapes involving a horizon or the panning of a movie camera where the primary subject is not in the field of view of the auto focus system. When this problem arises, the focus system may make an error in determining the correct focus position and the system may misfocus, oscillate in the hunting mode or move to one of the ends of its extremities.

One solution to this problem is seen in my U.S. Pat. No. 4,085,320. In one embodiment thereof, the correlation signal is compared with the detector or hold capacitor voltage throughout the entire scan and if the correlation signal falls sufficiently far below the detector voltage, normally indication of a satisfactory contrast condition, then the lens drive motor is allowed to operate. If the correlation signal fails to fall below the detector voltage by the sufficiently large amount, which would be indicative of a low contrast condition, the operation of the lens drive motor is inhibited. In another embodiment of my U.S. Pat. No. 4,085,320, the fluctuations of the correlation signal from maximum to minimum are observed over an entire scan and if the fluctuations are great enough, the operation of the lens drive motor is allowed but if not great enough, the lens drive motor is inhibited.

While these systems are sufficient for most applications, a difficulty is encountered when there is variations in light levels such as might occur with flourescent lighting. Under these conditions, the correlation signal may have sufficiently large variations to indicate satisfactory contrast even though the actual contrast in the scene is too low.

The present invention overcomes this problem by checking the contrast condition in a predetermined portion of the correlation signal, as, for example, at the beginning or ending of a scan or at the point of window switch generation, rather than over a whole scan so that light intensity fluctuations do not effect the system.

DETAILED DESCRIPTION OF THE PREFERRED EMBODIMENT

Figure 7A:
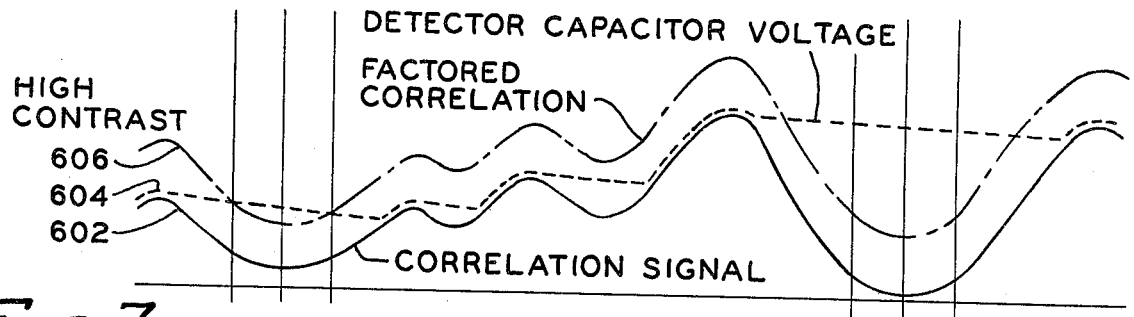
FIGS. 7a, 7b and 7c show the waveforms associated with one embodiment of the present invention.
Figure 7B:
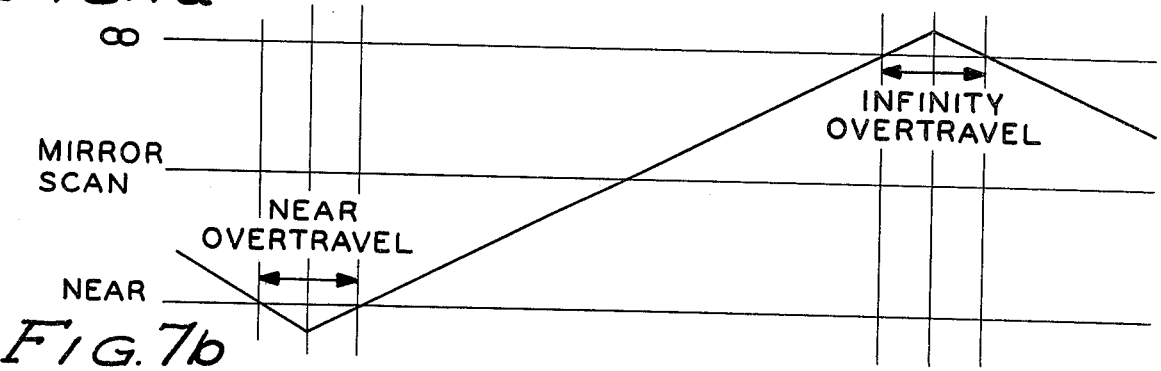
Figure 7C:
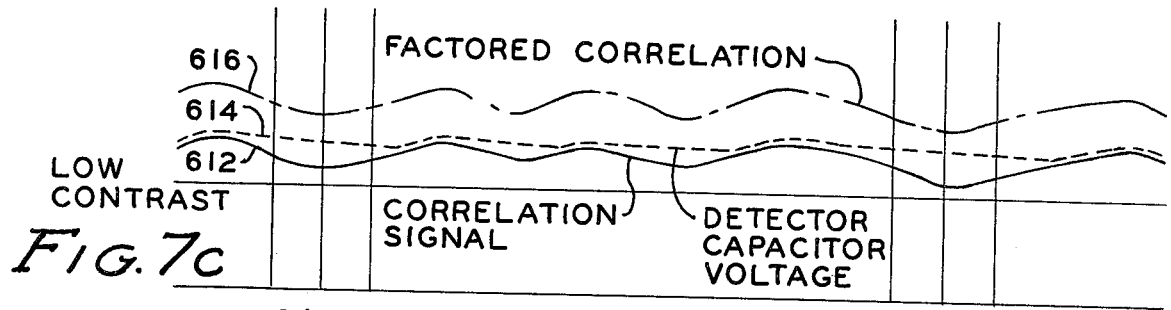

FIGS. 7a, 7b and 7c show graphs of a correlation signal in high contrast condition and in a low contrast condition as measured over a distance of mirror scan travel from "near" to "infinity". In FIG. 7a, a correlation signal that might exist in a high contrast condition is identified by reference numeral 602 and is seen to move in a series of three peaks, the last of which is the major peak representative of the position of the subject in the field of view. Dashed line 604 shows how the detector capacitor voltage follows the correlation signal in a manner similar to that described in connection with FIG. 4a. A third line identified by reference numeral 606 is a factored correlation voltage which is created in a manner to be described below but which generally follows the correlation signal at a slightly higher value.

FIG. 7b shows the mirror travel from near to far or infinity. It should be noticed that the three vertical lines on the left of all three graphs represent an area identified as "near overtravel" which is the amount of travel beyond the normal "bear" position for the closest subjects which are desired to be photographed. Likewise, the three vertical lines on the right of the graphs indicate an area identified as "infinity overtravel" and this area represents the amount of motion of the mirror beyond the furthest subjects which are desired to be photographed, usually at infinity. These overtravel areas are described in connection with FIG. 1 and are utilized in one embodiment of the present invention to determine a low contrast condition.

FIG. 7c shows a correlation signal 612 which might exist in a low contrast condition. It is seen that the correlation signal 612 again has three peaks with the peak nearest the infinity position being largest indicative of the position of focus for the desired subject. This correlation signal, however, shows that the peaks are of nearly the same amplitude and the largest peak may be larger only because of other errors in the system such as a mismatch of detectors. This provides a difficult situation for the auto focus system and may produce a mis-focus condition. Again, the detector capacitor voltage is shown and identified by reference numeral 612 as following the correlation signal in a manner similar to that shown in connection with FIG. 4a. A third curve in FIG. 7c, identified by reference numeral 616, is again a factored correlation signal which follows the correlation signal at a somewhat higher level and the creation and use of this factored correlation signal will be described hereinafter.

It should be noted that during the "near overtravel" and "infinity overtravel" portions of the scan, the correlation signal is normally lower than the signal during the active portion of the scan. The reason for this being that the subjects to be focused upon will not appear in the "near overtravel" and in "infinity overtravel" portions of the scan so that there is usually poor correlation in these areas. With lack of correlation, the signal in these areas tends to be indicative of the background signal and thus may be used to provide an indication of contrast which varies with the difference in magnitude between the correlation peaks and the background. Thus, in one embodiment of the present invention, the magnitude of the correlation signal in the overtravel regions will be used as the portion of the signal from which to determine whether or not sufficient contrast exists in the scene being viewed to provide satisfactory operation.

It is seen in FIG. 7that the detector capacitor voltage follows the correlation signal during the active scan in the same manner as was described in connection with FIG. 4a. However, the detector capacitor voltage is not reset to zero at the end of each scan as was the case in connection with the circuitry described above but rather, in a manner to be described below, holds the voltage it received at the major extremum and slowly decays during the overtravel time towards a peak to be encountered during the return scan. This is shown on the far right hand portion of the graphs of FIGS. 7a and 7c. The return scan in FIGS. 7a, 7b and 7c is shown to be at normal speed and noncompressed. It should be understood, however, that the return scan may be compressed in the same manner as was described in connection with FIG. 6 during times $T_9$ and $T_{13}$ by using the cam 5 of FIG. 1. As seen in both FIGS. 7a and 7c, the detector capacitor voltage slowly decays between the major extremum encountered just to the left of the infinity overtravel until it is again raised by the major extremum encountered on the return scan just to the right of the infinity overtravel. During the infinity overtravel portion, the detector capacitor voltage is seen to maintain a relatively high value compared to the correlation signal and the factored correlation signal.

In FIG. 7c, representative of a low contrast condition, it is seen that the detector capacitor voltage during the infinity overtravel portion still exceeds the correlation signal by a small amount due to the fact that the last peak encountered before the infinity overtravel position was higher than the background signal which is received during the overtravel portions. In this case, however, the factored correlation signal is now higher than the detector capacitor voltage during the overtravel portions and it is this fact that is indicative of the low contrast condition. In other words, whenever the factored correlation signal, which will vary above the correlation signal by an amount which is preset into the system in accordance with the desired contrast limit, is greater than the detector capacitor voltage during the near overtravel or infinity overtravel portions of the scan, it will be considered that the peak voltage obtained during the scan is not sufficiently higher than the background signal obtained during the overtravel portions and thus, the contrast is too low.

Whenever this condition exists; i.e., the factored correlation signal being higher than the detector capacitor voltage during the overtravel portions of the drive, a circuit to be described in connection with FIG. 8 below will operate to inhibit the operation of the lens driving motor and thus "freeze" the focus position last obtained. For proper operation of the system, it is important that sufficient non-vignetted overtravel must exist at the near and infinity positions such that the contrast measurement can be made. An overtravel motion of approximately one degree or greater at each end of the normal scan has been found sufficient to provide the required measurements.

In operation, the auto focus system would function as described in connection with FIGS. 5 and 6 so long as the correlation voltage is lower by the prescribed amount in an overtravel portion of the scan than the maximum peak detected during the regular or active portion of the scan. The focus inhibit circuit functions by comparing the voltage levels of the factored correlation signal with the stored peak correlation voltage on the peak detector hold capacitor. The factored correlation voltage is approximately equal to the correlation voltage but is shifted positively with respect to the correlation voltage by a prescribed amount, for example 50 to 100 millivolts. If the difference between peak correlation voltage and background correlation voltage, as measured in the overtravel portions, is less than this prescribed amount, then the auto focus system is inhibited and the focussing will stop until a subject of higher contrast enters the field of view. This provides improved stability of the auto focus system in low contrast situations and avoids large focus errors and focus oscillation when panning.

Figure 8:
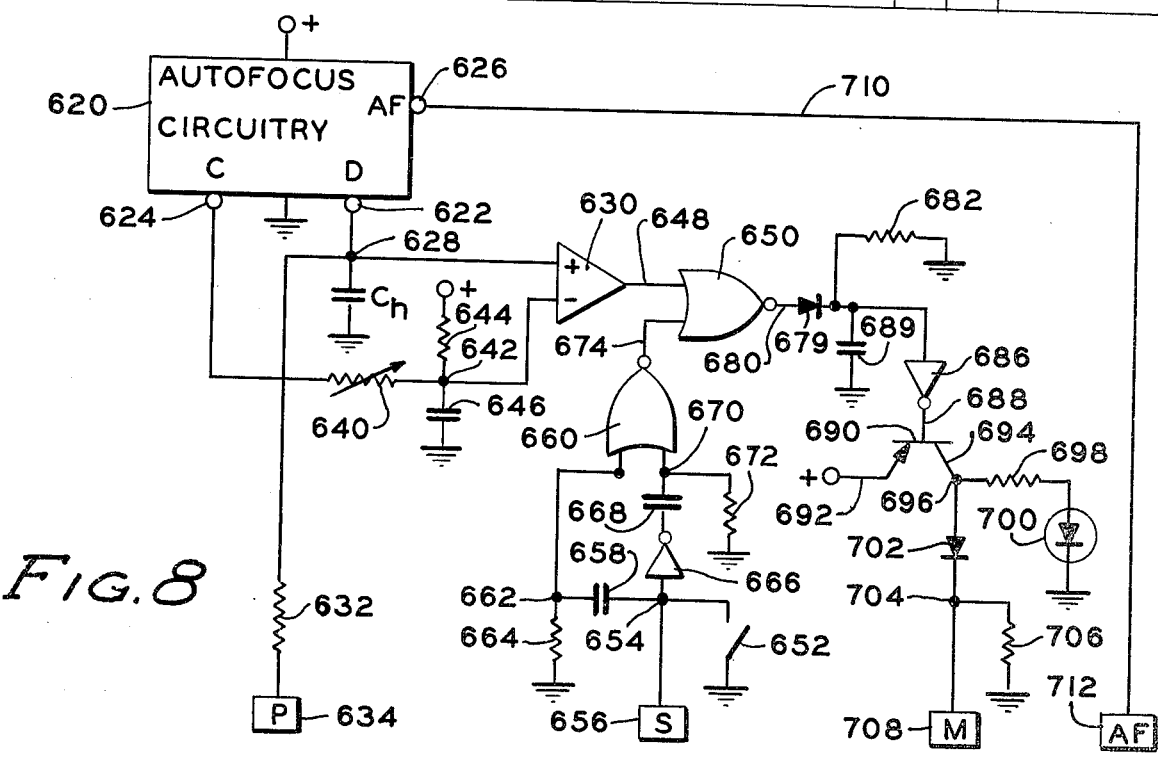
FIG. 8 shows a circuit diagram of one embodiment of the present invention utilized in connection with the waveforms of FIGS. 7a, 7b and 7c.

FIG. 8 shows a schematic diagram of the inhibit circuit. In FIG. 8, the auto focus circuitry, which would include the module and peak detection circuitry of FIG. 3 above, is identified by reference numeral 620. As in FIG. 3, the auto focus circuitry 620 has a detector terminal 622 identified by the letter "D", a correlation terminal 624 identified by the letter "C" and an auto focus terminal 626 identified with the letters "AF". Detector terminal 622 is connected to the detector capacitor $C_h$ through a junction point 628 which is connected to the positive input of a comparator amplifier 630. Terminal 628 is also connected by a resistor 632 to a terminal 634 identified by letter "P". Terminal "P" is the same as terminal 16 of FIG. 5 which was used in the circuit described above to discharge the hold capacitor at the end of each scan. However, in the present case, the magnitude of resistor 630 is chosen so as to prevent the complete discharge of the detector capacitor at the end of each scan and rather allow a slow discharge so that the detector capacitor's voltage is reduced by a small amount thus assuring that it will be able to detect the correlation peak of the next following active scan cycle but still retain a high enough voltage to be used in the comparison with the factored correlation signal during the overtravel portions of the scan. If resistor 632 is chosen of a value of approximately 200 K Ohms, then a voltage reduction of perhaps 50 millivolts will occur which is satisfactory to assure proper operation.

The correlation terminal 624 of auto focus circuitry 620 is shown connected through a variable resistor 640 to a junction terminal 642 which is connected to the negative input terminal of comparator amplifier 630. Junction point 642 is connected through a resistor 644 to the positive voltage supply for the system and is connected through a capacitor 646 to signal ground. The circuit comprising variable resistor 640, fixed resistor 644 and capacitor 646 operates to produce a signal at junction point 642 and the negative input terminal of amplifier 630 which is nearly equal to the correlation signal appearing on terminal 624 but higher than the correlation signal by an amount which can be varied with the changing of variable resistor 640. This shift is an approximation and is dependent on resistor 644 being of significantly larger value than variable resistor 640. Thus, the signal to the negative input terminal of comparator amplifier 630 is the factored correlation signal discussed in connection with FIGS. 7a and 7c. This signal is compared with the detector capacitor voltage which exists at junction point 628 and the positive terminal of comparator amplifier 630 so that the output of amplifier 630 will be a signal which is indicative of the sign of the difference in magnitude between the detector capacitor voltage and the factored correlation voltage. More particularly, if the detector capacitor voltage exceeds the factored correlation signal, then the output of comparator amplifier 630 will be a positive or "1" signal whereas if the factored correlation signal exceeds the detector capacitor voltage, the output of amplifier 630 will be a negative or "0" signal. The output of amplifier 630 is connected by a conductor 648 to one input terminal of a NOR gate 650.

In the lower portion of FIG. 8, a switch, identified by reference numeral 652, is shown having one contact connected to signal ground and the other contact connected to a junction point 654 which is shown connected to a terminal 656 which has the letter "S" therein. Switch 652 corresponds to the "sync" switch described in connection with FIG. 1 and terminal 656 corresponds to terminal 12 of FIG. 5. Junction point 654 is connected through a capacitor 658 to one input terminal of a NOR gate 660 by way of a junction point 662. Junction point 662 is connected through a resistor 664 to ground. Junction point 654 is also connected through an inverter 666 connected in series with a capacitor 668 to a junction point 670 which is connected to the other input terminal of NOR gate 660. Junction point 670 is connected through a resistor 672 to ground. The output of NOR gate 660 is shown on a conductor 674 connected to the other input terminal of NOR gate 650.

Sync switch 652 opens at the beginning of each scan cycle and closes at the end. The opening occurs midway in the near overtravel portion of the scan and the closing occurs midway in the infinity overtravel porton of the scan.

During steady state conditions when sync switch 652 is either open or closed, the inputs to NOR gate 660 will be "0" by virtue of the connection through resistors 672 and 664 to ground. Thus, the output of NOR gate 660 on conductor 674 during the steady state conditions will be a "1". With a "1" signal on the lower input terminal of NOR gate 650, the output of NOR gate 650 will be a "0".

During the transition times when sync switch 652 just opens or closes, a positive or negative going signal will appear on terminal 654. With a positive going signal on terminal 654, a positive voltage or "1" signal will appear on the left hand input terminal of NOR gate 660 but because of inverter 666, a negative or "0" pulse will appear at the right had input of NOR gate 660. On the other hand, with a negative going pulse at point 654, a negative or "0" pulse will appear on the left hand input terminal of NOR gate 660 while a positive or "1" pulse will appear on the right hand input terminal of NOR 660. In either case, a "0" output will momentarily appear on conductor 674 and the lower input terminal of NOR gate 650. If a "0" signal appears on conductor 648 and the upper input terminal of NOR gate 650, which signal will appear only during times when the factored correlation signal exceeds the detector capacitor voltage;

i.e., low contrast times, a "1" signal will appear at the output of NOR gate 650. If the signal on conductor 648 and the upper terminal of NOR gate 650 is a "1", which occurs whenever a detector capacitor voltage exceeds the factored correlation signal; i.e., high contrast conditions, the output of NOR gate 650 will be "0". Thus, the only time that the "1" signal will appear at the output of terminal 650 is when the contrast conditions are low and then only during the sync switch transition times which occur during the near and infinity overtravel portions of the scan. This "1" output signal will only last a short time since as soon as the sync switch closure or opening has lasted for a moment, the output of NOR gate 660 will again become a "1" and the output of NOR gate 650 will again become "0".

The output of NOR gate 650 appears on a conductor 680 and through a resistor 682 and parallel capacitor 684 to ground. Capacitor 684 charges rapidly upon the occurrence of a "1" signal on conductor 680. When the output of NOR gate 650 returns to a "0", diode 679 prevents discharge of capacitor 684 through the output of NOR gate 650. Resistor 682 is chosen of such magnitude as to allow the charge on capacitor 684 to drain off in a time approximately equal to one scan cycle. Therefore, when a low contrast condition occurs, a "1" output from NOR gate 650 will momentarily occur during an over travel portion of the scan thus charging capacitor 684 to hold this voltage for the remaining portion of the scan. The voltage on capacitor 684 is presented to the input of a inverter 686 which has an output on conductor 688 connected to the base of a PNP transistor 690. When the input to inverter 686 is a "1" from capacitor 684 indicating a low contrast condition, the output of inverter 686 will be a "0" on conductor 688 thus turning transistor 690 to an on condition. Whenever the signal on conductor 680 is a "0" during high contrast times, the output of inverter 686 will be a "1" and transistor 690 will be turned off.

When transistor 690 is in an on condition, current will flow from a source of positive potential through the emitter 692 and the collector 694 of transistor 690 to a junction point 696. Junction point 696 is connected through a resistor 698 and an indicator such as LED diode 700 to signal ground so that the LED device 700 will light to indicate that the low contrast condition exists. Current will also flow from junction point 696 through a diode 702 to a junction point 704 which is connected by a resistor 706 to ground and to a terminal 708 containing the letter "M". Terminal 708 is the same as terminal 19 of FIG. 5 which will be recalled as the terminal which has a voltage thereon set slightly lower than the reference voltage so as to provide a minimum pulse drive to the auto focus motor. Whenever a positive signal appears at terminal 696 indicating a low contrast condition, the voltage at terminal 708 of FIG. 8 and terminal 19 of FIG. 5 will increase by an amount sufficient to make the output of amplifier 320 of FIG. 5 a "1" in which case the lower terminals of both NOR gate 190 and NOR gate 192 will be "1" thereby assuring that transistors 200 and 202 will be turned "off" and motor 226 cannot be activated.

It is therefore seen that whenever a low contrast condition exists as detected at one or both of the overtravel portions of the mirror scan, the drive motor for the lens system will be inactivated thus preventing a change of focus as desired. By the time the next active scan begins, the voltage on capacitor 684 of FIG. 8 will have disappeared through resistor 682 and the positive voltage on terminal 708 of FIG. 8 will likewise disappear. If during the next scan the contrast again returns to a satisfactorily high level, the operation of the circuit of FIG. 5 will not be inhibited and will continue as described above. Should the contrast condition still remain low, however, the output of NOR gate 650 will again become positive for a short time again charging capacitor 684 turning on transistor 690 and producing a positive signal to terminal 708 to inhibit the operation of the motor.

The auto focus terminal 626 of FIG. 8 is shown connected by conductor 710 to a terminal 712 labelled "AF" which corresponds to the AF terminal 14 of FIG. 5. This connection is shown for completeness and does not play a part in the contrast sensing circuitry described.

It is thus seen that FIG. 8 provides a circuit which will prevent operation of the auto focus system when a sufficiently low contrast condition exists. The size of the factored correlation signal is chosen by adjusting variable resistor 640 so that the system can be tuned to respond to as low a contrast condition as it is capable of handling without the operation of the inhibit circuit herein described. In an actual embodiment of the circuit of FIG. 8, the following components have the following values:

Resistor 632—200 K Ohms
Resistor 640—50 K Ohms
Resistor 644—1 MegOhms
Capacitor 646—1.0 μf
Capacitor 658—0.01 μf
Resistor 644—100 K Ohms
Capacitor 668—0.01 μf
Resistor 672—100 K Ohms
Resistor 682—2 M Ohms
Capacitor 684—0.01 μf
Resistor 698—470 Ohms Although the circuit described above in connection with FIGS. 7 and 8 operates quite satisfactorily for controlling problems associated with low contrast scenes, there are certain circumstances under which the circuit may not operate as desired. For example, if high level correlation signals occur in the overtravel portions of the scan which could happen when two quite similar objects were in the field of view and the non-scanned detector saw one of the objects while the scanned detector, when directed in the near or infinity overtravel portions saw the other, then the system might indicate a low contrast condition even though the scene actually being viewed during the active portion of the scan had a sufficiently high contrast to produce satisfactory focus. Although such conditions might seldom occur, FIGS. 9 and 10 show apparatus which will determine the contrast conditions in the active portion of the scan rather than in the infinity and near overtravel portions and more particularly will determine the contrast conditions at the present position of the taking lens and thus where the real problem with inadequate contrast occurs.

Figure 9A:
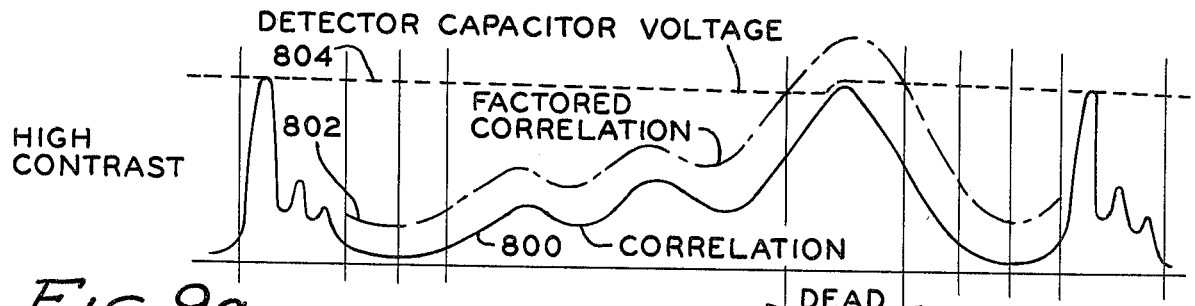
FIGS. 9a, 9b and 9c show the waveforms associated with a second embodiment of the present invention.
Figure 10:
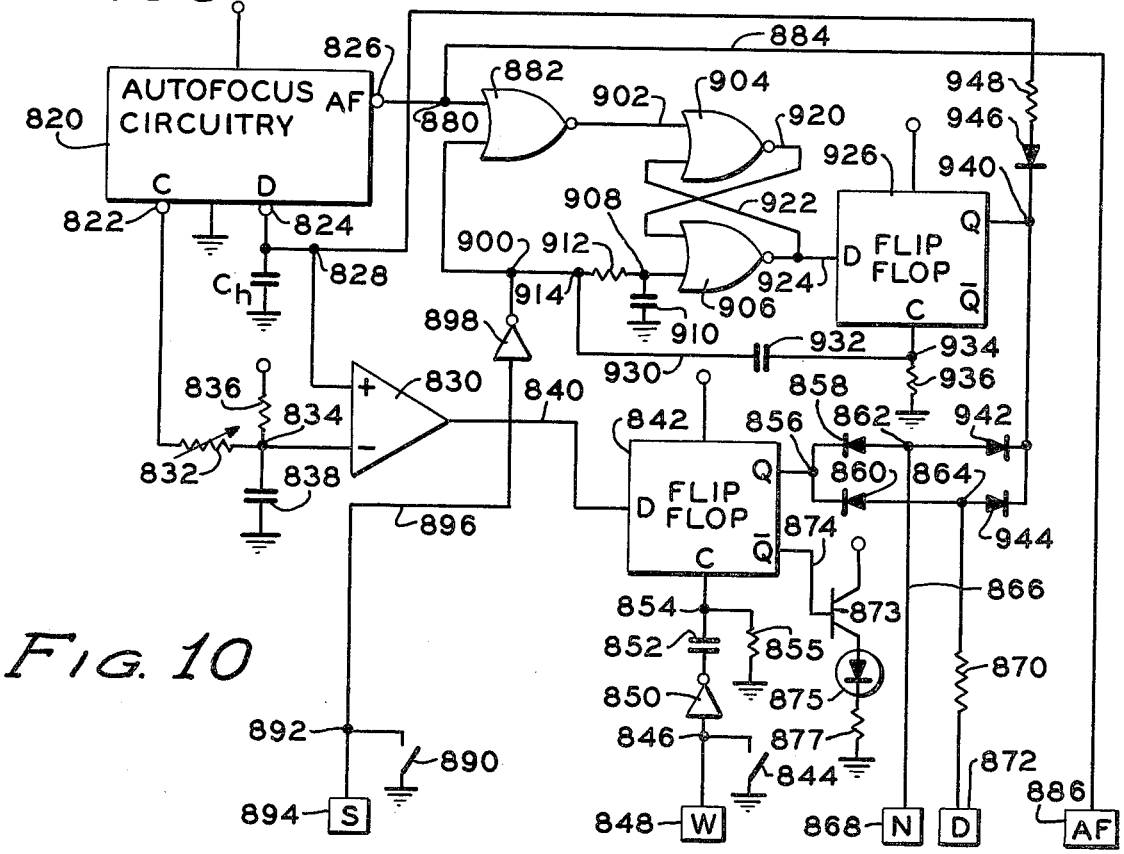
FIG. 10 shows the circuitry associated with a second embodiment of the present invention utilized in connection with the waveforms of FIGS. 9a, 9b and 9c.

Referring to FIG. 9a, the correlation curve 800 is shown having three extremum or peaks wherein the third is the highest representing the correlation position. As was true in FIG. 7a, a factored correlation curve 802 is shown which follows the correlation curve shape but is at a slightly higher voltage than the correlation voltage. Likewise, as was the case in FIG. 7a, a detector capacitor voltage curve, shown as dashed line 804, is shown and it should be noted that the voltage stays at about the same level throughout the entire scan including the overtravel portions and the return scan portions. The reason for this will be explained hereinafter. Like was the case in FIG. 6 but not in FIG. 7a, the return scan portions of the curve have been compressed so as to increase the speed of operation but again this feature is a matter of choice. FIG. 9a represents a high contrast situation and it should be noticed that the major extremum or peak is fairly sharp with respect to its breadth and that the area between where the detector capacitor voltage intersects the factored correlation curve on both sides of the peak, labelled as "deadband", is relatively narrow.

Figure 9B:
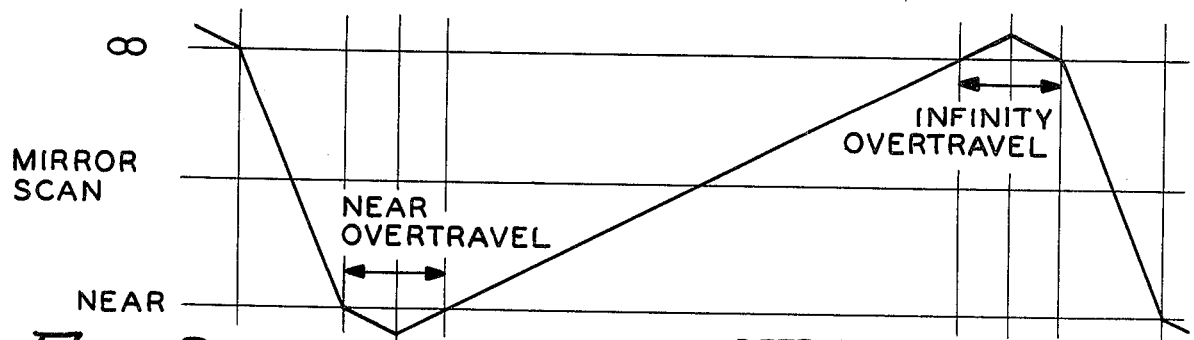

FIG. 9b, like FIG. 7b, shows the mirror scan from near to infinity and also shows the near overtravel and infinity overtravel portions of the curve although these will not be used in determining contrast conditions. The return scan portions are much steeper in slope showing that the cam operation is in effect causing the mirror to return the scan more quickly than it scans in the active portion of the range.

Figure 9C:
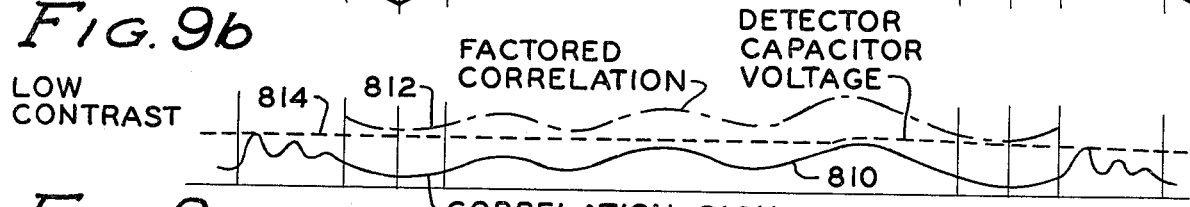

FIG. 9c shows the correlation signal 810 in a low contrast situation wherein the peaks are not very pointed and the heights of the peaks are not very different. Again, the factored correlation curve, identified in FIG. 9c with reference numeral 812, follows the correlation signal but at a slightly higher voltage. Likewise, the detector capacitor voltage shown as dashed line 814 is shown being rather flat all the way across the entire scan and return scan portions as was the case in FIG. 9a but now lying almost entirely below the factored correlation curve. It is seen that since the detector capacitor voltage curve does not intersect the factored correlation curve, there is no deadband area shown but in effect the entire scan would be considered to be "deadband". In between the situation seen in FIG. 9a of high contrast and FIG. 9c of low contrast the heights or sharpness of the correlation signal peaks become less and less while the width of the deadband becomes greater and greater. As will be discussed in connection with FIG. 10, no lens focusing can occur when the window switch (that switch which operates at the lens position during the scan) closes within the deadband area and accordingly the operation of the focusing motor is inhibited depending upon the width of the deadband which is related to the contrast of the scene being viewed. In other words, at low contrast, where there is a very wide deadband, the window switch closure will always occur during the deadband and thus the focussing motor will not operate. On the other hand, where there is a sharply peaked correlation signal in a high contrast situation, the window switch operation will normally fall outside of the deadband unless the lens position is already quite near the correlation major peak and thus will cause a focussing motion of the taking lens except when it is already near focus.

FIG. 10 shows the circuitry operable to produce the contrast control deadband described in connection with FIGS. 9a, 9b and 9c. In FIG. 10, the auto focus circuitry 820 is shown having three output terminals as was the case in FIG. 8. Output terminal 822 is the correlation signal output, output terminal 824 is the detector output and output terminal 826 is the auto focus output terminal. The detector terminal 824 is connected to a junction point 828 which in turn is connected to the plus input terminal of the comparator amplifier 830. Junction point 828 is also connected through the detector capacitor $C_h$ to signal ground.

The correlation terminal 822 is connected through a variable resistor 832 to a junction point 834 which is connected to the negative terminal of the comparator amplifier 830. Junction point 834 is also connected through a resistor 836 to a source of positive potential and is connected through a capacitor 838 to signal ground. Thus as was the situation in connection with FIG. 8, comparator amplifier 830 receives an input at its plus terminal indicative of the voltage on the detector capacitor and receives a factored correlation signal on its negative terminal which varies with the correlation signal but at a voltage higher than the correlation signal by an amount depending upon the setting of variable resistor 832. Thus as was the case in connection with FIG. 8, the output of the comparator amplifier 830 appearing on conductor 840 will be high or a "1" whenever the detector capacitor voltage exceeds the factored correlation voltage as is the case in a high contrast situation and the output on conductor 840 will be low or a "0" whenever the factored correlation voltage exceeds the detector capacitor voltage which is the case when a low contrast situation exists.

The output of comparator amplifier 830 on conductor 840 is connected to the "D" input terminal of a flip-flop 842. The signal appearing on the D input of flip-flop 842 will be transferred to the "Q" output of flip-flop 842 whenever a positive pulse is received at the "C" input of flip-flop 842. A positive pulse is received at input C of flip-flop 842 whenever the window switch, shown in the lower portion of the drawing identified by reference numeral 844, closes. Switch 844 is connected to a junction point 846 which is connected to a terminal 848 identified with the letter "W" which is the same terminal as terminal 10 of FIG. 5 and is connected to the input of a inverter 850, the output of which is connected through a capacitor 852 to a junction point 854 connected to input terminal C of flip-flop 842. Junction terminal 854 is also connected through a resistor 855 to signal ground. When window switch 844 closes indicative of the situation of the scan reaching a position corresponding to the present lens position, a negative signal will be applied to inverter 850 so that a positive pulse is applied to input terminal "C" of flip-flop 482 thus transferring whatever signal is on the input terminal "D" to the output terminal "Q" of flip-flop 842.

The "Q" output of flip-flop 842 is connected to a junction point 856 and through a pair of diodes 858 and 860 to junction points 862 and 864 respectively. Junction point 862 is connected by a conductor 866 to a terminal 868 identified with the letter "N" which is the same terminal as terminal 17 of FIG. 5. Junction point 864 is connected through a resistor 870 to a terminal 872 identified with the letter "D" which is the same as terminal 18 of FIG. 5. It is seen that when a low or "0" signal appears at the output "Q" of flip-flop 842, current is enabled to flow from terminals 868 and 872 through junction points 862 and 864 and through diodes 858 and 860 respectively. As will be observed from FIG. 5, this has the effect of discharging capacitors $C_N$ and $C_D$ whenever the signal on output at "Q" of flip-flop 842 becomes "0" which occurs whenever the window switch 844 operates and a "0" signal appears at the output of comparator amplifier 830 indicative of a low contrast of deadband situation. When capacitor $C_D$ is discharged in FIG. 5, the output of amplifier 320 of FIG. 5 will be high or a "1" thus assuring that the outputs of NOR gates 190 and 192 of FIG. 5 are "0" so that both NPN transistors 200 and 202 will be in an off condition thereby inhibiting operation of motor 226.

Returning to FIG. 10, at the time the Q output of flip-flop 842 becomes "0", a Q output will become "1". This "1" signal is presented to the base of a NPN transistor 873 by a conductor 874. Transistor 873 has its collector connected to a source of positive potential and its emitter connected through an indicator such as light emitting diode 875 and resistor 877 to signal ground. Thus, when the contrast is insufficient and operation of the auto focus system is inhibited, a "1" signal at the Q terminal of flip-flop 842 will operate to turn transistor 873 to a on condition thereby providing an indication via light emitting diode 875 that insufficient contrast exists.

It should be noted that the detector capacitor $C_h$ is not connected to the terminal identified with letter "P", the terminal 16 of FIG. 5, as it was before so that at the end of each scan when the sync switch closes there will be no discharge of capacitor $C_h$ and the detector capacitor voltage will continue at its high level decaying only slightly throughout the overtravel portion of the scan and the return portion of scan into the next active portion of scan. This is necessary for the apparatus to sense contrast as was described in connection with FIGS. 9a and 9c.

A problem can arise with the detector capacitor voltage remaining high since the major extremum or peak in the following cycle may be less than was the case in the previous cycle so that the detector capacitor voltage never encounters a peak in the next cycle. This condition can occur due to subject motion, for example, and if the peak detector voltage is always greater than the correlation voltage, the auto focus signal, derived in accordance with the circuitry shown in FIG. 3, will always be a "1" which would then cause the focus control electronics to drive the lens focus position to the "near" end of travel regardless of the actual correlation peak location and this would produce a focus error. The problem can be eliminated by inhibiting focussing if the auto focus signal is always a "1" during the active portion of the scan.

Circuitry for inhibiting operation of the motor when the auto focus signal is a "1" during the entire active portion of the scan is formed by the elements found in the upper portion of FIG. 10. The auto focus terminal 826 is connected to a junction point 880 which is connected to one input terminal of a NOR gate 882. The auto focus signal is also connected by a conductor 884 to a terminal 886 containing the letters "AF" which terminal is the same as terminal 14 of FIG. 5.

The sync switch, shown in the lower portion of FIG. 10 and identified by reference numeral 890, is connected between ground and a junction 892 which is connected to a terminal 894 identified by the letter "S" which is the same as terminal 12 of FIG. 5. Junction point 892 is connected by a conductor 896 to an inverter 898 whose output is connected to a junction point 900 connected to the other input terminal of NOR gate 882. Whenever the sync switch 890 opens at the beginning of a scan cycle, a positive signal is presented to inverter 898 so that a negative signal appears at junction point 900 and the lower input terminal of NOR gate 882. If, at this time, the auto focus signal appearing at junction 880 is a "1", the output of NOR gate 882 on conductor 902 will be a "0" but if the signal at terminal 880 from the auto focus terminal 826 is a "0", then the output signals from NOR gate 882 on conductor 902 will be a "1".

An RS flip-flop comprised of NOR gates 904 and 906 is shown in FIG. 10 with the upper terminal of NOR gate 904 connected to the output of NOR gate 882 by the conductor 902 and the lower input terminal of NOR gate 806 connected to a junction point 908 connected through a capacitor 910 to ground and through a resistor 912 to a junction point 914. Junction point 914 is in turn connected to junction point 900 at the output of inverter 898. The output of NOR gate 904, appearing on conductor 920, is connected to the upper input terminal of NOR gate 906 while the output of NOR gate 906, appearing on conductor 922, is connected to the lower input terminal of NOR gate 904. The output of NOR gate 906 is also connected by conductor 924 to the "D" input terminal of a flip-flop 926. Junction point 914 is connected by a conductor 930 and a capacitor 932 to a junction point 934 which is connected to the "C" input of flip-flop 926. Junction 934 is also connected through a resistor 936 to ground. Whenever a positive pulse appears at terminal "C" of flip-flop 926, a signal appearing at terminal "D" will be transferred to terminal "Q" of flip-flop 926 in a manner similar to that described in connection with flip-flop 842. The output at terminal "Q" of flip-flop 926 is connected to a junction point 940 and through diodes 942 and 944 to junction points 862 and 864 previously described. Junction point 940 is also connected through a diode 946 and a resistor 948 to the junction point 828 on the upper terminal of the detector capacitor $C_h$.

The RS flip-flop comprised of NOR gates 904 and 906 is initially set so that the output of NOR gate 904 on conductor 920 is a "1" thus producing a "0" at the output of NOR gate 906 on conductor 924. When sync switch 890 opens at the beginning of a cycle, a positive pulse to the input of inverter 898 causes a negative signal to appear at the lower terminal of both NOR gate 882 and 906. With the auto focus signal from junction 880 being a "1", the output of NOR gate 882 will be a "0" and the situation will be stable.

If during the scan the auto focus signal at junction point 880 changes to a "0", then both inputs to NOR gate 882 will be "0" and the output on conductor 902 will change to a "1". This changes the state of the RS flip-flop producing a "0" on conductor 920 which, when combined with the "0" input at junction point 908, produces a "1" on conductor 924 to the "D" terminal of flip-flop 926 and to the lower terminal of NOR gate 904. Under these conditions, when the sync switch closes again at the end of the scan, a positive signal will appear to the "C" input of flip-flop 926 thus transferring the "1" signal at the "D" terminal of flip-flop 926 to the "Q" terminal and thus to junction point 940. When junction point 940 is positive or "1", no change occurs in the system and operation of the auto focus circuitry is normal.

On the other hand, if the auto focus signal at terminal 826 and junction point 880 were to remain positive during the entire cycle, then at the time the sync switch 890 closed thereby producing a positive pulse to the terminal "C" of flip-flop 926, a negative or "0" signal would exist on terminal "D" of flip-flop 926 which would produce a "0" or negative signal at junction point 940 connected to the "Q" terminal of flip-flop 926. When this occurs, the capacitor $C_D$ and $C_N$ would discharge through diodes 942 and 944 so as to inhibit operation of the focus motor in a manner described above. The detector capacitor $C_h$ would also be discharged through resistor 948 and diode 946 so that on the next following scan it would again be charged up by the correlation peaks and would come to a voltage dependent upon the major extremum in the correlation voltage.

Thus, it is seen that whenever the auto focus signal remains a "1" during an entire scan, then the focus motor will be inhibited from further operation while the detector capacitor is reset so as to be able to determine the highest peak of the next succeeding scan. The problem of a subject moving and causing a smaller correlation peak is thus overcome.

It is thus seen that the circuitry of FIG. 10 will provide operation at a selected portion in the active part of the scan to determine when the contrast is high enough to produce a focus signal and will inhibit the operation of the focus motor whenever the contrast is so low that focus errors might occur.

For an actual embodiment of the circuit of FIG. 10, the following components having the following values will be found to produce satisfactory operation:
Resistor 832 50K Ohms
Resistor 1 MegOhms
Capacitor 838 1.0 µf
Capacitor 852 0.001 µf
Resistor 856 10K Ohms
Resistor 870 10K Ohms
Resistor 877 200 Ohms
Capacitor 910 0.001 µf
Resistor 912 50K Ohms
Capacitor 932 0.001 µf
Resistor 946 10K Ohms
Resistor 948 10K Ohms Many changes and modifications to the circuitry described in connection with the preferred embodiments will occur to those skilled in the art. For example, while the preferred embodiments have shown to be useful in connection with the continuous focus proportional controller of copending application Ser. No. 834,760, the principles involved are equally applicable to other types of auto focus control circuits. For example, where, in the system described, a scan is accomplished by moving a mirror to encompass a scene so that the signals vary in time, an array of detectors may be used, such as is shown in copending application of Norman L. Stauffer, Ser. No. 912,688, filed June 5, 1978 and assigned to the assignee of the present invention. In such case, the detectors may receive radiation from the scene simultaneously so that the signals vary in space. Likewise, the specific components and their arrangements shown in connection with the preferred embodiments should not be considered limiting since alternative components and arrangements will occur to those skilled in the art. For example, the variable resistor, fixed resistor and capacitor combination connected to the correlation output of the auto focus circuitry so as to produce a factored correlation signal, could be exchanged for a number of alternate possible signal modifying means and, of course, the flip-flop circuitry for holding and transferring signals has equivalent counterparts which could be substituted by those skilled in the art. I therefore do not intend to be limited by the specific disclosures used in connection with the preferred embodiments but rather intend to be limited only by the following claims.

The embodiments of the invention in which an exclusive property or right is claimed are defined as follows:

1. Apparatus for use in controlling the drive means of an auto focus system comprising:

sensing means receiving radiation from the scene, comparing radiation intensities from two selected portions of the scene as an indication of contrast and producing an output signal when the contrast is below a predetermined value; and inhibit means connected to said sensing means to receive the output signal and upon receipt to prevent operation of the drive means.

2. Apparatus according to claim 1 wherein the sensing means includes first and second radiation responsive detector means operable to produce an electrical signal of magnitude which vary with the amount of radiation falling thereon and further includes comparator means connected to said first and second detector means to receive the electrical signals therefrom and to produce the output signal when the magnitudes at two selected portions of the electrical signals vary less than a predetermined amount indicative of a low contrast condition.

3. Apparatus according to claim 2 wherein said comparator means includes combining means for combining the electrical signals from said first and second detector means to produce a correlation signal which varies with time and which normally contains an extremum value at a time indicative of a desired focus condition and wherein said comparator means further includes responsive means connected to said combining means to receive the correlation signal and to produce the output signal when the magnitude of the correlation signal at a first of the selected portions is less than the magnitude of the correlation signal at a second of the selected portions by a predetermined amount.

4. Apparatus according to claim 3 including means producing a factored correlation signal which varies with the correlation signal but at a value different than the value of the correlation signal by a predetermined amount and wherein detector means connected to the combining means and receiving the correlation signal operates to produce a hold signal which approximately maintains a signal indicative of the extremum value for at least a predetermined time and wherein said responsive means compares the factored correlation signal with the hold signal at the first selected portion.

5. Apparatus according to claim 1 including indicator means connected to said sensing means to receive the output signal to indicate the contrast is below the predetermined value.

6. In apparatus for use with an auto focus system for a camera having a taking lens, the system including first and second detector means each operable to produce a detector signal of magnitude which varies with the amount of radiation received thereby, the system further including first means directing radiation along a first path from a scene containing a subject to be focused upon to the first of the detector means, the system further including second means directing radiation along a second path from the scene to the second of the detector means, said second means operable to change the second path from a first direction at a near extremity which intersects the first path at a point closer to the auto focus system than any subject to be focused upon is intended to be to a second direction at a far extremity which is beyond being parallel with the first path, said second means periodically scanning the scene from the near extremity to the far extremity and back with the portion of the scan between a position representative of the closest a subject is intended to be to a position where the first and second paths are parallel comprising the active portion of the scan, the portion of the scan closer to the system than the active portion comprising the near overtravel portion and the portion of the scan further than the active portion comprising the far overtravel portion, the system further including correlator means connected to the first and second detector means, receiving the detector signals therefrom and operable to produce a correlation signal which varies in magnitude during the scan and normally contains an extremum which corresponds to the position of the subject to be focused upon, the system further including storage means connected to the correlator means, receiving the correlation signal and operable to provide a further signal indicative of the magnitude of the extremum, the system further including positioning means connected to said correlator means, receiving the correlation signal and operable to position the taking lens of the camera in accordance therewith, the improvement comprising:

comparator means connected to the correlator means and to the storage means to compare the correlation signal with the further signal during a predetermined portion of the scan and to produce an output signal if the magnitudes differ by less than a predetermined amount indicative of a condition of low contrast in the scene; and means connecting said comparator means to the positioning means so as to inhibit the positioning of the taking lens upon the occurrence of an output signal.

7. Apparatus according to claim 6 wherein the predetermined portion of the scan is an over travel portion.

8. Apparatus according to claim 6 wherein the predetermined portion of the scan is at a position corresponding to the position of the taking lens of the camera.

9. Apparatus according to claim 6 further including signal generating means connected to the correlator means to produce a factored correlation signal of magnitude which changes with the correlation signal but at a value different than the correlation signal by a predetermined amount and wherein said comparator means is connected to the signal generating means so as to compare the factored correlation signal with the further signal to produce the output signal when the factored correlation signal exceeds the detector signal during the predetermined portion of the scan.

10. Apparatus according to claim 9 wherein the predetermined portion of the scan is an overtravel portion.

11. Apparatus according to claim 9 wherein the predetermined portion of the scan is adjacent the position of the extremum.

12. Apparatus according to claim 6 including indicator means connected to said comparator means and receiving the output signal to indicate the condition of low contrast.

13. In apparatus for use with an auto focus system for a camera having a taking lens and motive means for positioning the taking lens, the auto focus system producing a correlation signal that varies with time and normally contains several peaks the major one of which is indicative of a desired focus position, the auto focus system also producing a detector signal which follows the correlation signal and holds the value of the peaks as they are encountered, and the auto focus system also producing an auto focus signal which changes state from a low value to a high value and back depending on the relative magnitude of the correlator signal with respect to the detector signal, the auto focus signal being operative to control the motive means of the camera for positioning the taking lens at a desired focus position, the improvement comprising:

comparator means connected to receive the correlation signal and the detector signal and to produce an output signal whenever the correlation signal and the detector signal differ by more than a predetermined amount at a predetermined time; and inhibit means connected to said comparator means and to the motive means and operable upon receipt of the output signal to inhibit operation of the motive means.

14. Apparatus according to claim 13 wherein the comparator mean includes signal adjusting means operable to produce a factored correlation signal which varies with the correlation signal but at a level higher than the correlation signal by a predetermined amount and the output signal is produced whenever the factored correlation signal exceeds the detector signal at the predetermined time.

15. Apparatus according to claim 13 including means connected to the auto focus system and to the motive means to receive the auto focus signal and operable whenever the auto focus does not change state for a predetermined time period to inhibit operation of the motive means and to reduce the detector signal to a reference value.

16. In apparatus for use with an auto focus system in a camera which has a taking lens, motive means operable to position the taking lens, fixed means for directing radiation from a scene containing a subject to be focused upon along a first path to the auto focus system, variable means for directing radiation from the scene along a second path to the auto focus system, the variable means operable to scan the scene between a near position and a far position with the second path crossing the first path at a distance from the system equal to the closest allowable system-to-subject distance shortly after leaving the near position in the scan and with the second path paralleling the first path shortly before arriving at the far position in the scan, the auto focus system providing a correlation signal which varies in magnitude during the scan and which normally has a plurality of peaks, the largest of which occurs when the first path intersects the second path at the subject, the auto focus system also providing a detector signal which normally rises from a reference value at the beginning of a first scan and follows the correlation signal magnitude during the scan until a peak is encountered and then maintains the peak value until a larger peak is encountered in the scan whereupon it follows the correlation signal again until the new peak is reached, the value of the detector signal at the end of the scan being indicative of the magnitude of the largest peak in the correlation signal, said auto focus system also providing an auto focus signal which changes state from low value to a high value during the scan whenever the detector signal exceeds the correlation signal and changes state from the high value back to the low value during the scan whenever the correlation signal exceeds the detector signal, the last change of state being a low value to a high value occurring when the largest peak in the correlation signal has been reached as an indication of the desired focus position, the auto focus system also including first position responsive means which produces a first signal proximate the near and far position in the scan, the auto focus system also including second position responsive means which produces a second signal at that portion of the scan when the first and second paths intersect at a distance corresponding to the present focus position of the taking lens, the auto focus system also including control circuitry connected to the motive means and receiving the auto focus signal and the first and second signals to produce an output signal for operation of the motive means to drive the taking lens toward a desired focus position, the improvement comprising:

comparator means connected to the auto focus circuit to receive the correlator signal and the detector signal to produce a comparator signal whenever the correlation signal exceeds the detector signal by a predetermined amount in a predetermined portion of the scan;

sensing circuitry connected to said comparator means to receive the comparator signal and connected to the auto focus system to receive the first signal and operable upon the simultaneous occurrence of the first signal and the comparator signal to produce an inhibit signal; and first connecting means connecting said sensing circuitry to the control circuitry to prevent operation of the motive means upon the occurrence of an inhibit signal.

17. Apparatus according to claim 16 wherein said sensing circuitry comprises gate means having a first input terminal connected to said comparator means to receive the comparator signal and having a second input terminal connected to the auto focus system to receive the first signal and producing the inhibit signal at the output thereof.

18. Apparatus according to claim 17 wherein the gate means is a NOR gate, the comparator signal is a logical "0", the first signal is a logical "0" and the inhibit signal is a logical "1".

19. In apparatus for use with an auto focus system in a camera which has a taking lens, motive means operable to position the taking lens, fixed means for directing radiation from a scene containing a subject to be focused upon along a first path to the auto focus system, variable means for directing radiation from the scene along a second path to the auto focus system, the variable means operable to scan the scene between a near position and a far position with the second path crossing the first path at a distance from the system equal to the closest allowable system-to-subject distance shortly after leaving the near position in the scan and with the second path paralleling the first path shortly before arriving at the far position in the scan, the auto focus system providing a correlation signal which varies in magnitude during the scan and which normally has a plurality of peaks, the largest of which occurs when the first path intersects the second path at the subject, the auto focus system also providing a detector signal which normally rises from a reference value at the beginning of a first scan and follows the correlation signal magnitude during the scan until a peak is encountered and then maintains the peak value until a larger peak is encountered in the scan whereupon it follows the correlation signal again until the new peak is reached, the value of the detector signal at the end of the scan being indicative of the magnitude of the largest peak in the correlation signal, said auto focus system also providing an auto focus signal which changes state from low value to a high value during the scan whenever the detector signal exceeds the correlation signal and changes state from the high value back to the low value during the scan whenever the correlation signal exceeds the detector signal, the last change of state being a low value to a high value occurring when the largest peak in the correlation signal has been reached as an indicated of the desired focus position, the auto focus system also including first position responsive means which produces a first signal proximate the near and far position in the scan, the auto focus system also including second position responsive means which produces a second signal at that portion of the scan when the first and second paths intersect at a distance corresponding to the present focus position of the taking lens, the auto focus system also including control circuitry connected to the motive means and receiving the auto focus signal and the first and second signals to produce an output signal for operation of the motive means to drive the taking lens toward a desired focus position, the improvement comprising:

comparator means connected to the auto focus circuit to receive the correlator signal and the detector signal to produce a comparator signal whenever the correlation signal exceeds the detector signal by a predetermined amount at a predetermined portion of the scan;

sensing circuitry connected to said comparator means to receive the comparator signal and connected to the auto focus system to receive second signal and operable upon the simultaneous occurrence of the second signal and the comparator signal to produce an inhibit signal; and first connecting means connecting said sensing circuitry to the control circuitry to prevent operation of the motive means upon occurrence of an inhibit signal.

20. Apparatus according to claim 19 wherein said sensing circuitry includes a flip-flop having a first terminal connected to said comparator means to receive the comparator signal, having a second terminal connected to the second position responsive means to receive the second signal and having a third terminal connected to said connecting means so that when the second signal is received at the second terminal, any comparator signal appearing at the first terminal is transferred to the third terminal for presentation by said first connecting means to the control circuitry.

21. Apparatus according to claim 19 including further means connected to the auto focus system to receive the auto focus signal and connected to said first position responsive means to receive the first signal and operable to produce a further signal when the auto focus signal does not change state from a high value to a low value during the scan between the near and far positions and second connecting means connected to said further means and to said control circuitry to prevent operation of the motive means upon the occurrence of a further signal.

22. Apparatus according to claim 21 further including third connecting means connected to said further means and to said auto focus system to reduce the detector signal to a reference value upon the occurrence of a further signal.

23. Apparatus for use in a system wherein the lens is positioned in accordance with radiation received from a scene, the apparatus producing a signal when the variation in radiation intensity in the scene falls below a predetermined level comprising:

radiation sensitive means receiving radiation from the scene and producing a signal which varies with variations in radiation intensity from the scene and has peaks and valleys therein:

comparing means operable to detect the difference in magnitude between at least one peak and at least one predetermined portion of the signal as an indication of the variation in radiation intensity from the scene and to produce an output signal when the difference falls below a predetermined minimum value;

control means connected to said comparing means and receiving the output signal to produce a control output when the difference has fallen below the predetermined value; and lens positioning means for positioning the lens and connected to said control means with the control output operating to inhibit said positioning means.

* * * * *